(12) United States Patent
Guidarelli et al.

(10) Patent No.: US 8,450,905 B2
(45) Date of Patent: May 28, 2013

(54) METHODS FOR CONTROLLING VELOCITY OF AT LEAST PARTIALLY RESONANT ACTUATORS SYSTEMS AND SYSTEMS THEREOF

(75) Inventors: Thomas Guidarelli, Farmington, NY (US); Robert L. Culhane, Manchester, NY (US); David A. Henderson, Farmington, NY (US)

(73) Assignee: New Scale Technologies, Victor, NY (US)

(*) Notice: Subject to any disclaimer, the term of this patent is extended or adjusted under 35 U.S.C. 154(b) by 356 days.

(21) Appl. No.: 12/460,701

(22) Filed: Jul. 23, 2009

(65) Prior Publication Data

US 2011/0018390 A1 Jan. 27, 2011

(51) Int. Cl.
*H02N 2/06* (2006.01)
*H02N 2/14* (2006.01)

(52) U.S. Cl.
CPC ..................................... *H02N 2/14* (2013.01)
USPC ..................................... 310/317; 310/323.01

(58) Field of Classification Search
CPC ........... H01L 41/042; H02N 2/14; H02N 2/142
USPC .................. 310/316.02, 317, 323.01–323.21, 310/328
See application file for complete search history.

(56) References Cited

U.S. PATENT DOCUMENTS

| | | | |
|---|---|---|---|
| 5,955,819 | A | 9/1999 | Takano et al. |
| 6,147,435 | A | 11/2000 | Fujimura |
| 6,918,300 | B2 | 7/2005 | Grez et al. |
| 7,436,101 | B1 | 10/2008 | Magnussen et al. |
| 2005/0052098 | A1 | 3/2005 | Henderson |
| 2005/0067921 | A1* | 3/2005 | Yamamoto ..................... 310/317 |
| 2006/0071723 | A1* | 4/2006 | Takeuchi ......................... 331/65 |
| 2007/0247023 | A1* | 10/2007 | Tanimura ................. 310/316.01 |
| 2008/0018200 | A1 | 1/2008 | Vogeley et al. |
| 2008/0284284 | A1 | 11/2008 | Kawada et al. |

OTHER PUBLICATIONS

International Search Report for International Patent Application No. PCT/US10/42515 (Sep. 14, 2010).
Ronkanen et al., "Current Control of Piezoelectric Actuators with Environmental Compensation," Micro.Tec 2003, 2nd VDE World Microtechnologies Congress, Munich, Germany pp. 323-328 (Oct. 2003).
Ronkanen et al., "Current Control of Piezoelectric Actuators with Power Loss Compensation," IEEE/RSJ International Conference on Intelligent Robots and Systems (IROS), Lausanne, Switzerland pp. 1948-1953 (Oct. 2002).
Ronkanen et al., "Displacement Control of Piezoelectric Actuators Using Current and Voltage," IEEE/ASME Transactions on Mechanics pp. 1-7 (Oct. 22, 2007).

(Continued)

*Primary Examiner* — Derek Rosenau
(74) *Attorney, Agent, or Firm* — LeClairRyan, a Professional Corporation

(57) ABSTRACT

A method, computer readable medium, and system for controlling velocity of at least partially resonant actuator system includes obtaining at an actuator controller computing system a selected operating velocity within an operational velocity range for at least one of one or more at least partially resonant actuator devices. A width of one or more pulses of a driving signal for the at least one of one or more at least partially resonant actuator devices is adjusted with the actuator controller computing system based on the selected operating velocity. The driving signal with the adjusted width of the one or more pulses is provided with the actuator controller computing system to obtain the selected operating velocity at the at least one of the one or more at least partially resonant actuator devices.

33 Claims, 10 Drawing Sheets

OTHER PUBLICATIONS

Ronkanen et al., "Self Heating of Piezoelectric Actuators: Measurement and Compensation," IEEE International Symposium on Micro-Nanomechatronics and Human Science (MHS), Nagoya, Japan pp. 313-318 (Nov. 2004).

Ronkanen et al., "Simultaneous Actuation and Force Estimation Using Piezoelectric Actuators," IEEE International Conference on Mechatronics and Automation (ICMA), Harbin, China pp. 3261-3265 (Aug. 2007).

Ronkanen, "Current Measurement in Control and Monitoring of Piezoelectric Actuators," presented at TAMPERE University of Technology Publication 723 pp. 1-71 (Mar. 28, 2008).

Written Opinion of the International Searching Authority for International Patent Application No. PCT/US10/42515 (Sep. 1, 2010).

\* cited by examiner

METHODS FOR CONTROLLING VELOCITY OF AT LEAST PARTIALLY RESONANT ACTUATORS SYSTEMS AND SYSTEMS THEREOF

FIELD OF THE INVENTION

This invention relates to methods and systems for controlling velocity and, more particularly, methods for controlling velocity of at least partially-resonant actuator systems and systems thereof.

BACKGROUND

Resonant actuator systems are used in a variety of different applications, such as to move optics within cameras by way of example only. Examples of resonant actuator systems may be found in U.S. Pat. No. 6,940,209, titled, "Ultrasonic Lead Screw Motor"; U.S. Pat. No. 7,339,306, titled, "Mechanism Comprised of Ultrasonic Lead Screw Motor"; U.S. Pat. No. 7,170,214, titled, "Mechanism Comprised of Ultrasonic Lead Screw Motor"; and U.S. Pat. No. 7,309,943, titled, "Mechanism Comprised of Ultrasonic Lead Screw Motor," which are hereby incorporated herein by reference in their entireties. In these different applications, control over the velocity of operation of the resonant actuator systems often is required.

One method of velocity control of resonant actuator systems is to control the drive voltage. In this method, the drive voltage (typically between about 16 volts and about 40 volts) is varied by a controller, which results in a corresponding variation in the rotational and linear velocity of the threaded element of the motor. Drive voltage is the most power efficient method of regulating the motor speed, but often is louder and less precise than desired for particular applications. Additionally, controlling velocity with drive voltage is not well suited for motion control applications in which two or more motors are required. For example, two motors are needed for dynamic motion control in applications such as optical image stabilization (OIS) of digital cameras. The dynamic motion for OIS applications must correct for hand tremors and is generally a mix of sinusoidal waveforms with amplitudes up to 1 mm and frequencies up to 20 Hz. This dynamic motion control must be achieved without generating significant acoustic noise. Two axes of motion, and thus two independently controllable motors are required. When using drive voltage control with a single controller in communication with two motors, both motors share the same voltage. As a result, independent speed control of each motor by a single controller is not possible using drive voltage control.

Another method of velocity control of resonant actuator systems is "burst mode." This method uses a fixed drive voltage and outputs periodic "bursts" of motor drive waveforms to the motor. Shorter bursts result in a lower velocity and longer bursts result in a higher velocity. This method provides a wide range of speed control, and may be applied independently to two motors. However, it also creates significant audible noise in the moving motor, as well as a higher rate of wear of the motor components.

SUMMARY

A method for controlling velocity of at least a partially resonant actuator system in accordance with embodiments of the present invention includes obtaining at an actuator controller computing system a selected operating velocity within an operational velocity range for at least one of one or more at least partially resonant actuator devices. A width of one or more pulses of a driving signal for the at least one of one or more at least partially resonant actuator devices is adjusted with the actuator controller computing system based on the selected operating velocity. The driving signal with the adjusted width of the one or more pulses is provided with the actuator controller computing system to obtain the selected operating velocity at the at least one of the one or more at least partially resonant actuator devices.

A computer readable medium in accordance with other embodiments of the present invention includes having stored thereon instructions for controlling velocity of at least a partially resonant actuator system comprising machine executable code which when executed by at least one processor, causes the processor to perform steps including obtaining a selected operating velocity within an operational velocity range for at least one of one or more at least partially resonant actuator devices. A width of one or more pulses of a driving signal for the at least one of one or more at least partially resonant actuator devices is adjusted based on the selected operating velocity. The driving signal with the adjusted width of the one or more pulses is provided to obtain the selected operating velocity at the at least one of the one or more at least partially resonant actuator devices.

An actuator controller computing system in accordance with other embodiments of the present invention includes a selection processing system, an adjustment system, and an output system in an actuator controller system. The selection processing system obtains a selected operating velocity within an operational velocity range for at least one of one or more at least partially resonant actuator devices. The adjustment system adjusts a width of one or more pulses of a driving signal for the at least one of one or more at least partially resonant actuator devices based on the selected operating velocity. The output system provides the driving signal with the adjusted width of the one or more pulses to obtain the selected operating velocity at the at least one of the one or more at least partially resonant actuator devices.

An actuator system in accordance with other embodiments of the present invention includes one or more at least partially resonant actuator devices each comprising at least one vibratory member, at least one driving system, and an actuator controller. The driving system drives the at least one vibratory member with at least one driving signal at a driving frequency. The actuator controller obtains a selected operating velocity within an operational velocity range for at least one of the one or more at least partially resonant actuator devices, adjusts a width of one or more pulses of a driving signal for the at least one of the one or more at least partially resonant actuator devices based on the selected operating velocity, and provides the driving signal with the adjusted width of the one or more pulses to obtain the selected operating velocity at the at least one of the one or more at least partially resonant actuator devices.

A method for making an actuator system in accordance with other embodiments of the present invention includes providing at one or more at least partially resonant actuator devices each comprising at least one vibratory member. At least one driving system is operatively coupled to drive the at least one vibratory member with at least one driving signal at a driving frequency. An actuator controller is operatively coupled to obtain a selected operating velocity within an operational velocity range for at least one of the one or more at least partially resonant actuator devices, adjust a width of one or more pulses of a driving signal for the at least one of the one or more at least partially resonant actuator devices based on the selected operating velocity, and provide the driving signal with the adjusted width of the one or more pulses to obtain the selected operating velocity at the at least one of the one or more at least partially resonant actuator devices.

The present invention provides a number of advantages including providing more effective and efficient velocity control of at least partially resonant actuator devices. With the present invention, the velocities of multiple at least partially resonant actuator devices can be independently controlled using a single actuator controller. Additionally, the present invention is able to provide improved velocity control with lower power consumption and quieter operation than prior systems.

DETAILED DESCRIPTION

Figure 1:
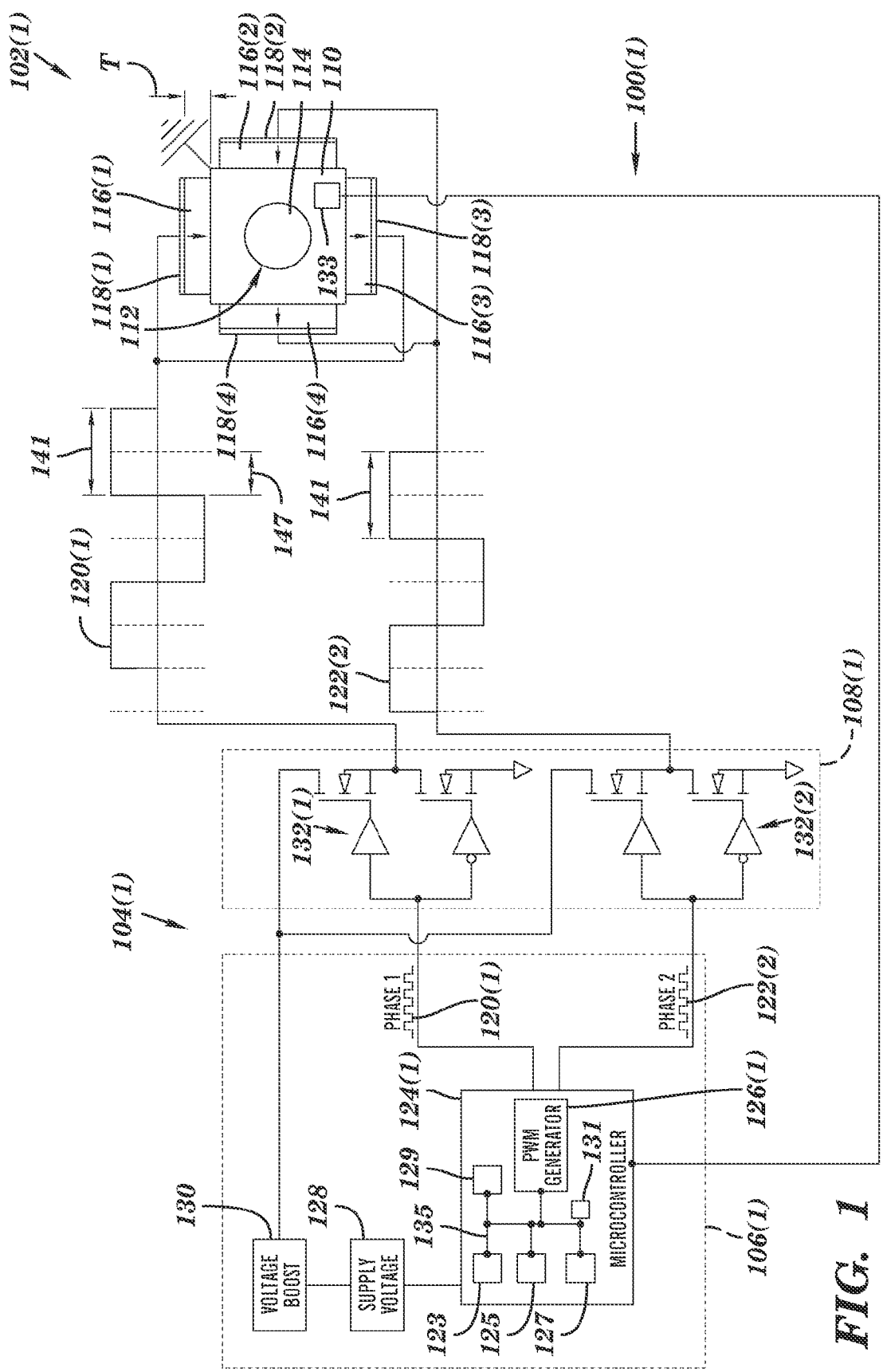
FIG. 1 is a partial block diagram, partial functional, and a partial end view of a resonant actuator system with a linear actuator device in accordance with embodiments of the present invention.

A resonant actuator system 100(1) in accordance with embodiments of the present invention is illustrated in FIG. 1. The actuator system 100(1) includes an actuator device 102(1) and a driving system 104(1) comprising an actuator controller system 106(1) and a driver assembly 108(1) and, although the system can comprise other numbers and types of systems, devices, and components which are connected in other manners. The present invention provides a number of advantages including providing more effective and efficient velocity control of at least partially resonant actuator devices.

Referring more specifically to FIG. 1, the actuator device 102(1) generates a force to move a load, such as an optical lens by way of example, in a linear direction at a controlled velocity, although the actuator device 102(1) can move other types of loads in other directions. The actuator device 102(1) in this embodiment is the same in structure and operation as the linear actuator device illustrated and disclosed in U.S. patent application Ser. No. 12/466,929, filed May 15, 2009 for, "Automated Drive Frequency Control For Resonant Actuator Systems And Methods Thereof" which is herein incorporated by reference, although other types of actuator devices can be used.

The actuator device 102(1) includes an element 110 with a threaded passage 112, a threaded shaft 114, piezoelectric members 116((1)-116(4), electrodes 118(1)-118(4), although the actuator device 102(1) can include other types and numbers of systems, devices, and components which are connected in other manners. The inner passage of the element 110 is threaded throughout its length, although the passage could have other configurations, such as being partially threaded. The threaded shaft 114 is screwed into the threaded passage 112 of the element 110 for rotation about and linear movement along the passage at a controlled velocity.

Each of the piezoelectric members 116(1)-116(4) comprises a single layer or plate of piezoelectric material having a thickness T, although other numbers and types of vibratory elements with other thicknesses could be used. Each of the piezoelectric members 116(1)-116(4) changes length across its thickness T when subjected to a voltage differential. The piezoelectric members 116(1) and 116(3) are connected to substantially opposing sides of element 110 about passage 112 and the piezoelectric members 116(2) and 116(4) also connected to substantially opposing sides of element 110 about passage 112, although other numbers of vibratory members connected in other configurations could be used. The electrodes 118(1)-118(4) are each coupled to one of the piezoelectric members 116(1)-116(4), respectively, to apply the voltage differential across the piezoelectric members 116 (1)-116(4) based on applied drive signals 120(1) and 122(1), although other manners of coupling other types and numbers of drive signals to the vibratory members can be used.

The piezoelectric members 116(1) and 116(3) bend the element 110 back and forth along a first plane in response to the drive signal 120(1) and the piezoelectric members 116(2) and 116(4) bend the element 110 back and forth along a second plane orthogonal to the first plane. The cyclical, offset excitation of the piezoelectric members 116(1) and 116(3) and the piezoelectric members 116(2) and 116(4) causes a corresponding cyclic and orthogonal bending motion of the element 110 back and forth in the first and second planes. This bending motion of the element 110 causes the threaded shaft 114 to rotate and translate in the direction along the length of the passage 112 at a velocity based on the applied drive signals.

A position sensor device 133 to measure a change in position of the threaded shaft 114 in the passage 112 in element 110 over time is located on the actuator device 102(1), although other types and numbers of sensors for measuring a current velocity of the threaded shaft 114 or other parameters in other locations could be used. The position sensor device 133 is coupled to the actuator processing device 124(1) to provide feedback on the current velocity of the threaded shaft 114, although other types and amounts of data about the actuator device 102(1) could be provided. The actuator processing device 124(1) compares the measured velocity of the threaded shaft 114 against a selected operating velocity and transmits instructions to the PWM generator system 126(1) to adjust a pulse width 141 of the drive signals 120 and 122 to adjust the measured velocity to the selected operating velocity, although other types of feedback control can be used.

The actuator controller system 106(1) in the driving system 104(1) in this embodiment is the same in structure and operation as the actuator controller system illustrated and disclosed in U.S. patent application Ser. No. 12/466,929, filed May 15, 2009 for, "Automated Drive Frequency Control For Resonant Actuator Systems And Methods Thereof" which is herein incorporated by reference, except as illustrated and described herein, although other types of actuator controller systems can be used. The actuator controller system 106(1) includes an actuator processing device 124(1) with a pulse width modulation generator (PWM) system 126(1), a supply voltage or voltage source 128, and a voltage boost system 130, although the actuator controller system 106(1) can include other types and numbers of systems, devices, and components which are connected in other manners.

The actuator processing device 124(1) in the actuator controller system 106(1) includes a processor 123, a memory 125, user input device 127, a display 129, a communication interface system 131, and the PWM generator system 126(1) which are coupled together by a bus or other link 135, although other numbers and types of systems, devices, and components in other configurations can be used and the PWM generator 126(1) can be separate from the actuator processing device 124(1). The processor 123 executes a program of stored instructions for one or more aspects of the present invention as described herein, including for controlling velocity of the resonant actuator device 102(1). The memory 125 stores these programmed instructions for one or more aspects of the present invention as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor 123 can be used for the memory 125. The user input device 127 is used to input selections, such as to input a drive mode selection, a selection of a percentage of pulse width, or a selection of a percentage of drive voltage, although the user input device 127 could be used to input other types of data and actions and interact with other elements. The user input device 127 can include a computer keyboard and a computer mouse, although other types and numbers of user input devices can be used, such as (but not limited to) a video game console controller, a mobile communications device keyboard, and a TV remote controller. The display 129 is used to show the graphical user interface for inputting requests and viewing the resulting response, although other types and amounts of information can be displayed in other manners. The display 129 can include a computer or mobile communications device display screen, such as a CRT or LCD screen, although other types and numbers of displays could be used. The communication interface system 131 is used to operatively couple and communicate between the actuator processing device 124(1) and the driver assembly 108(1) along with the actuator device 102(1) via one or more communications networks, although other types and numbers of connections, configurations, and communication manners can be used.

The PWM signal generator 126(1) generates at least two low-voltage driving signals 120(1) and 122(1) which are provided to half bridge drive circuits 132(1) and 132(2), respectively, in driver assembly 108(1) in response to instructions from the actuator processing device 124(1), although the PWM signal generator 126(1) could generate other numbers and types of signals which are provided to other types and numbers of systems or devices. The driving signals 120(1) and 122(1) each have a driving frequency which is substantially the same as the nominal mechanical resonant frequency of the element 110 of the actuator device 102(1), although other driving frequencies can be used, such as a driving frequency which is at a fixed offset from the mechanical resonant frequency. Additionally, the drive signal 120(1) is a squarewave voltage signal that is phase shifted about 90 degrees out of phase with respect to the second driving signal 122(1), as illustrated by reference numeral 147, which also is a squarewave voltage signal by the actuator controller 106(1), although other types of drive signals with other shapes and phase differentials can be used. A positive 90 degree phase shift of drive signal 120(1) with respect to drive signal 122(1) produces a positive or forward translation of the threaded shaft 114 at a selected operating velocity and a negative 90 degree phase shift of drive signal 120(1) with respect to drive signal 122(1) produces a negative or backward translation of the threaded shaft 114. Adjusting the drive voltage of the drive signals 120(1) and 122(1) with the voltage boost system 130 based on instructions from the actuator processing device 124(1) increases the maximum velocity of the operational velocity range of the actuator device 102(1) and adjusting a pulse width 141 of the drive signals 120(1) and 122(1) with the actuator processing device 124(1) adjusts a selected operating velocity of the actuator device 102(1) within the operational velocity range.

The voltage source 128 in the actuator controller system 106(1) is a battery supply system that supplies power to run the actuator processing device 124(1) and the driver assembly 108(1), although other types and numbers of power supplies which supply power to types and numbers of system, devices, and components can be used. The voltage boost system 130 in the actuator controller system 106(1) is coupled between the voltage source 128 and the driver assembly 108(1) and increases or boosts the supply voltage from the voltage source 128 in response to instructions from the actuator processing system 124(1), although other manners for adjusting and controlling the supply of voltage can be used.

Although an embodiment of the actuator controller system 106(1) with the actuator processing device 124(1) is described and illustrated herein, each of these systems could be implemented on any suitable computer system or device or an application specific integrated circuit or other programmable entity. It is to be understood that the systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, application specific integrated circuits, digital signal processors, and microcontrollers, programmed according to the teachings of the embodiments, as described and illustrated herein, and as will be appreciated by those ordinary skill in the art.

In addition, two or more computing systems or devices can be substituted for any one of the systems in any embodiment. Accordingly, principles and advantages of distributed processing, such as redundancy and replication also can be implemented, as desired, to increase the robustness and performance of the devices and systems of the embodiments. The embodiments may also be implemented on computer system, systems, or other devices that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

The driver assembly 108(1) in this embodiment is the same in structure and operation as the driver assembly illustrated and disclosed in U.S. patent application Ser. No. 12/466,929, filed May 15, 2009 for, "Automated Drive Frequency Control For Resonant Actuator Systems And Methods Thereof" which is herein incorporated by reference, although other types of driver assemblies can be used. The driver assembly 106(1) includes half bridge drive circuits 132(1) and 132(2), although the driver assembly 106(1) can include other numbers and types of systems, devices, assemblies, and components in other configurations, such as a full bridge drive circuit. Since the components and operation of half bridge drive circuits and full bridge drive circuits are well known to those of ordinary skill in the art, they will not be described in greater detail herein.

The half bridge drive circuit 132(1) has an input coupled to the PWM generator system 126(1) to receive the drive signal 120(1) and an output coupled to the piezoelectric members 116(1) and 116(3) to provide the drive signal 120(1). Additionally, the half bridge drive circuit 132(1) is coupled to receive power from the voltage boost system 130 which increases the amplitude or peak-to-peak voltage of the drive signal 120(1), although the half bridge drive circuit 132(1) can have other types and numbers of connections. Similarly, the half bridge drive circuit 132(2) has an input coupled to the PWM generator system 126(1) to receive the drive signal 122(1) and an output coupled to the piezoelectric members 116(2) and 116(4) to provide the drive signal 122(1). Additionally, the half bridge drive circuit 132(2) is coupled to receive power from the voltage boost system 130 which increases the amplitude or peak-to-peak voltage of the drive signal 120(1), although the half bridge drive circuit 132(2) can have other types and numbers of connections.

Figure 2:
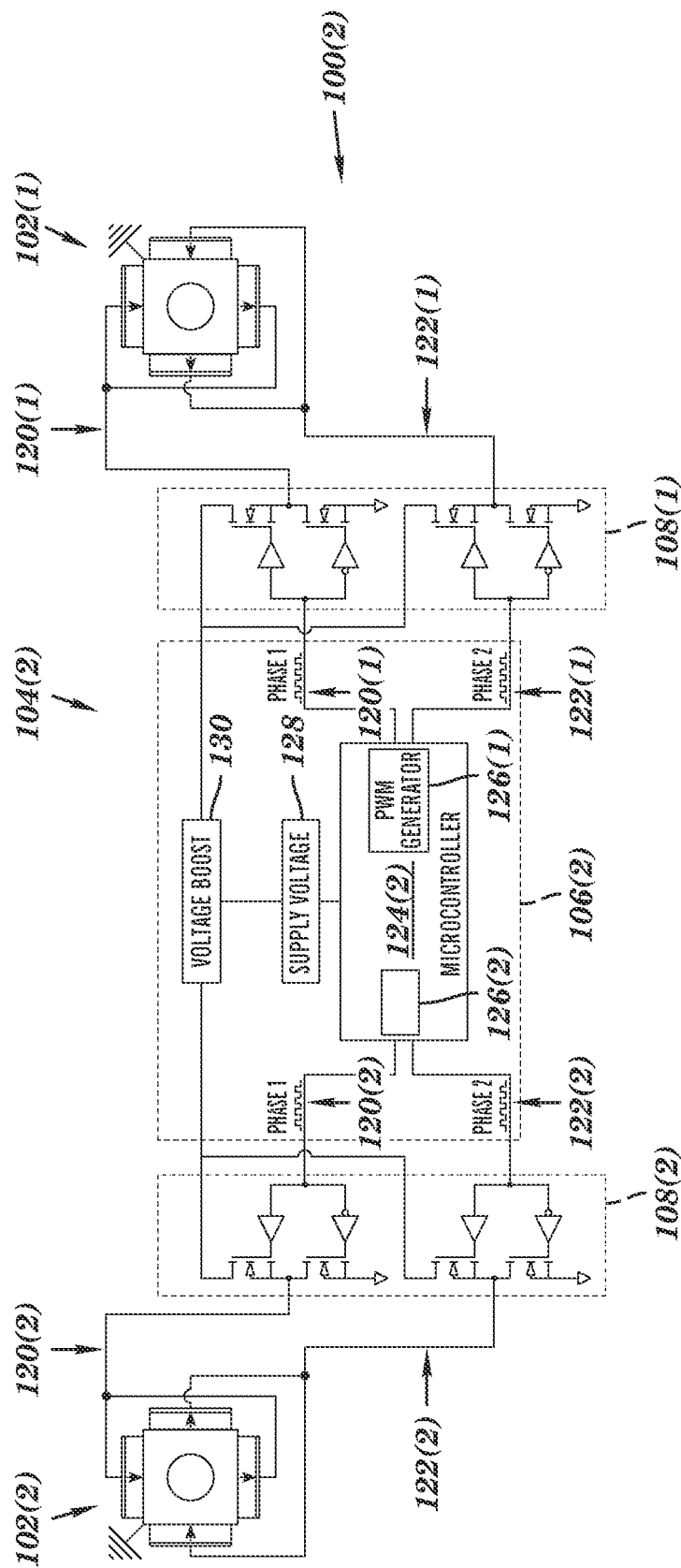
FIG. 2 is a partial block diagram, partial functional, and a partial end view of another resonant actuator system with a pair of linear actuator devices in accordance with embodiments of the present invention.

Referring to FIG. 2, another resonant actuator system 100(2) in accordance with other embodiments of the present invention is illustrated. The resonant actuator system 100(2) is the same as the resonant actuator system 100(1) in structure and operation, except as illustrated and described herein. Elements in actuator system 100(2) which are like those in actuator system 100(1) have like reference numerals. The actuator system 100(2) includes the actuator device 102(1), an actuator device 102(2), and a driving system 104(2) comprising an actuator controller system 106(2), the driver assembly 108(1), and a driver assembly 108(2), although the system can comprise other numbers and types of systems, devices, and components which are connected in other manners.

The actuator device 102(2) in this embodiment is the same in structure and operation as the actuator device 102(1) described earlier with reference to FIG. 1, although other types of actuator devices can be used. Accordingly, in this embodiment both actuator devices 102(1) and 102(2) are linear actuator devices whose operational velocity can be independently controlled by the same driving system 104(2).

The driving system 104(2) is the same as the driving system 104(1) in structure and operation, except as illustrated and described herein. The driving system 104(2) includes the actuator controller system 106(2), the driver assembly 108(1), and a driver assembly 108(2), although the driving system 104(2) can include other types and numbers of systems, devices, and components in other configurations.

The actuator controller 106(2) is the same as actuator controller 106(1) in structure and operation, except as illustrated and described herein. The actuator controller system 106(2) includes an actuator processing device 124(2) with the PWM generator system 126(1) and a PWM generator system 126(2), the voltage source 128, and the voltage boost system 130, although the actuator controller 106(2) can include other types and numbers of systems, devices, and components in other configurations.

The actuator processing device 124(2) is the same as the actuator processing device 124(1) in structure and operation, except as described and illustrated herein. The actuator processing device 124(2) includes a processor, a memory, a user input device, a display, a communication interface system, the PWM generator system 126(1), and a PWM generator system 126(2) which are coupled together by a bus or other link 135, although other numbers and types of systems, devices, and components in other configurations can be used and the PWM generators 126(1) and 126(2) each can be separate from the actuator processing device 124(2). The processor in the actuator processing device 124(2) executes a program of stored instructions for one or more aspects of the present invention as described herein, including for controlling velocity of at least the resonant actuator devices 102(1) and 102(2). The memory in the actuator processing device 124(2) stores these programmed instructions for one or more aspects of the present invention as described herein, although some or all of the programmed instructions could be stored and/or executed elsewhere. The user input device in actuator processing device 124(2) is used to input selections, such as to input a drive mode selection, a separate selection of a percentage of pulse width for each of the actuator devices 102(1) and 102(2), or a selection of a percentage of drive voltage, although the user input device could be used to input other types of data and actions and interact with other elements. The user input device in actuator processing device 124(2) can include a computer keyboard and a computer mouse, although other types and numbers of user input devices can be used, such as (but not limited to) a video game console controller, a mobile communications device keyboard, and a TV remote controller. The display in actuator processing device 124(2) is used to show the graphical user interface for inputting requests and viewing the resulting response, although other types and amounts of information can be displayed in other manners. The display in actuator processing device 124(2) can include a computer or mobile communications device display screen, such as a CRT or LCD screen, although other types and numbers of displays could be used.

The communication interface system in actuator processing device 124(2) is used to operatively couple and communicate between the actuator processing device 124(2) and the driver assemblies 108(1) and 108(2) along with the actuator devices 102(1) and 102(2) via one or more communications networks, although other types and numbers of connections, configurations, and communication manners can be used. The drive signals 120(2) and 122(2) are the same as the drive signals 120(1) and 122(1), except the actuator processing device 124(2) can independently control the velocity of either actuator device 102(1) or 102(2) by independently adjusting the pulse width 141 of either or both drive signals 120(1) and 122(1) and drive signals 120(2) and 122(2).

The PWM signal generator 126(2) is the same as the PWM generator 126(1) and generates at least two low-voltage driving signals 120(2) and 122(2) which are provided to half bridge drive circuits in driver assembly 108(2) in response to instructions from the actuator processing device 124(2), although the PWM signal generator 126(2) could generate other numbers and types of signals which are provided to other types and numbers of systems or devices. The drive signals 120(2) and 122(2) are used to drive and control the velocity of the actuator device 102(2) in the same manner as drive signals 120(1) and 122(1) are used to drive and control the velocity of the actuator device 102(1) as described and illustrated herein. The driving signals 120(2) and 122(2) each have a driving frequency which is substantially the same as the nominal mechanical resonant frequency of the element of the actuator device 102(2), although other driving frequencies can be used, such as a driving frequency which is at a fixed offset from the mechanical resonant frequency. Additionally, the drive signal 120(2) is a square-wave voltage signal that is phase shifted about 90 degrees out of phase with respect to the second driving signal 122(2), as illustrated by reference numeral 147 in FIG. 1, which also is a square-wave voltage signal by the actuator controller 106(2), although other types of drive signals with other shapes and phase differentials can be used. A positive 90 degree phase shift of drive signal 120(2) with respect to drive signal 122(2) produces a positive or forward translation of the threaded shaft 114 at a selected operating velocity and a negative 90 degree phase shift of drive signal 120(2) with respect to drive signal 122(2) produces a negative or backward translation of the threaded shaft in actuator device 102(2). Adjusting the drive voltage of the drive signals 120(1) and 122(1) and the drive signals 120(2) and 122(2) with the voltage boost system 130 based on instructions from the actuator processing device 124(2) increases the maximum velocity of the operational velocity range of the actuator device 102(1) and of the actuator device 102(2). Adjusting a pulse width 141 of the drive signals 120(2) and 122(2) based on instructions from the actuator processing device 124(2) to the PWM generator system 126(2) allows for an adjustment to a selected operating velocity for the actuator device 102(2) within the operational velocity range. With embodiments of the present invention, this adjustment to a selected operating velocity for the actuator device 102(2) can be different and independent from a selected operating velocity for actuator device 102(1). As described earlier, the pulse width 141 of the drive signals 120(1) and 122(1) can be separately adjusted based on instructions from the actuator processing device 124(2) to the PWM generator system 126(1) to a different selected operating velocity for the actuator device 102(1) within the operational velocity range.

The voltage source 128 in the actuator controller system 106(2) is a battery supply system that supplies power to run the actuator processing device 124(2) and the driver assemblies 108(1) and 108(2), although other types and numbers of power supplies which supply power to types and numbers of system, devices, and components can be used. The voltage boost system 130 in the actuator controller system 106(2) is coupled between the voltage source 128 and the driver assemblies 108(1) and 108(2) and increases or boosts the supply voltage from the voltage source 128 in response to instructions from the actuator processing system 124(2), although other manners for adjusting and controlling the supply of voltage can be used The driver assembly 108(2) is the same in structure and operation as the driver assembly 108(1) described earlier with reference to FIG. 1, although other types of driver assemblies can be used, such as one with full bridge circuits. The driver assembly 108(2) provides the driving signals 120(2) and 122 (2) to drive and control the velocity of the actuator device 102(2) in the same manners that driver assembly 108(1) provides the driving signals 120(1) and 122(1) to drive and control the velocity of the actuator device 102(1). Although not shown, one or both of the actuator devices 102(1) and 102(2) may have the position sensor 133 or other type of sensor which provides feedback on the measured velocity of the actuator devices 102(1) and 102(2) to be used in a closed feedback loop adjust the velocity of the actuator devices 102(1) and 102(2).

Figure 3:
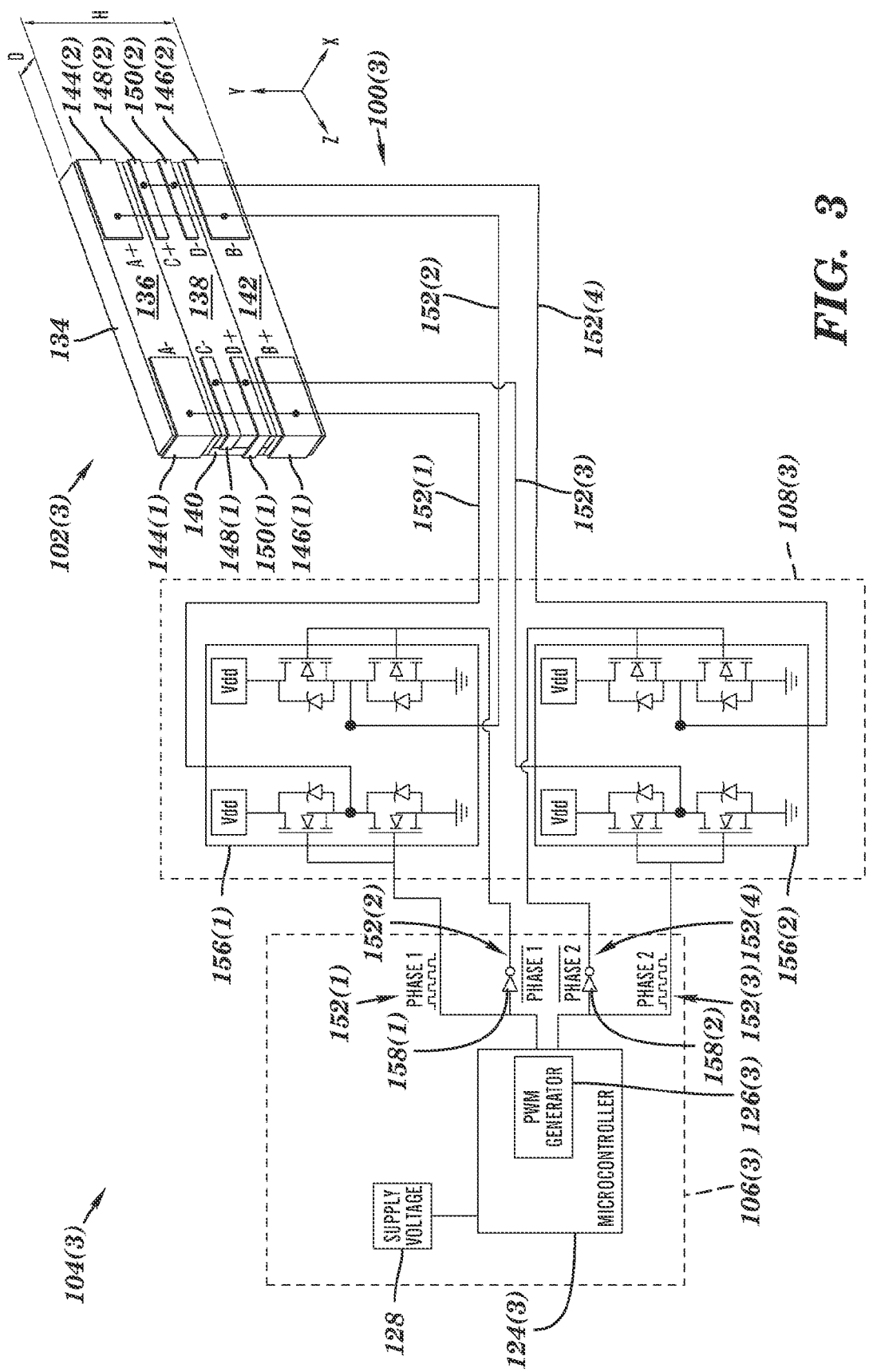
FIG. 3 is a partial block diagram, partial functional, and a partial end view of an at least partially resonant drive actuator system in accordance with embodiments of the present invention.
Figure 4:
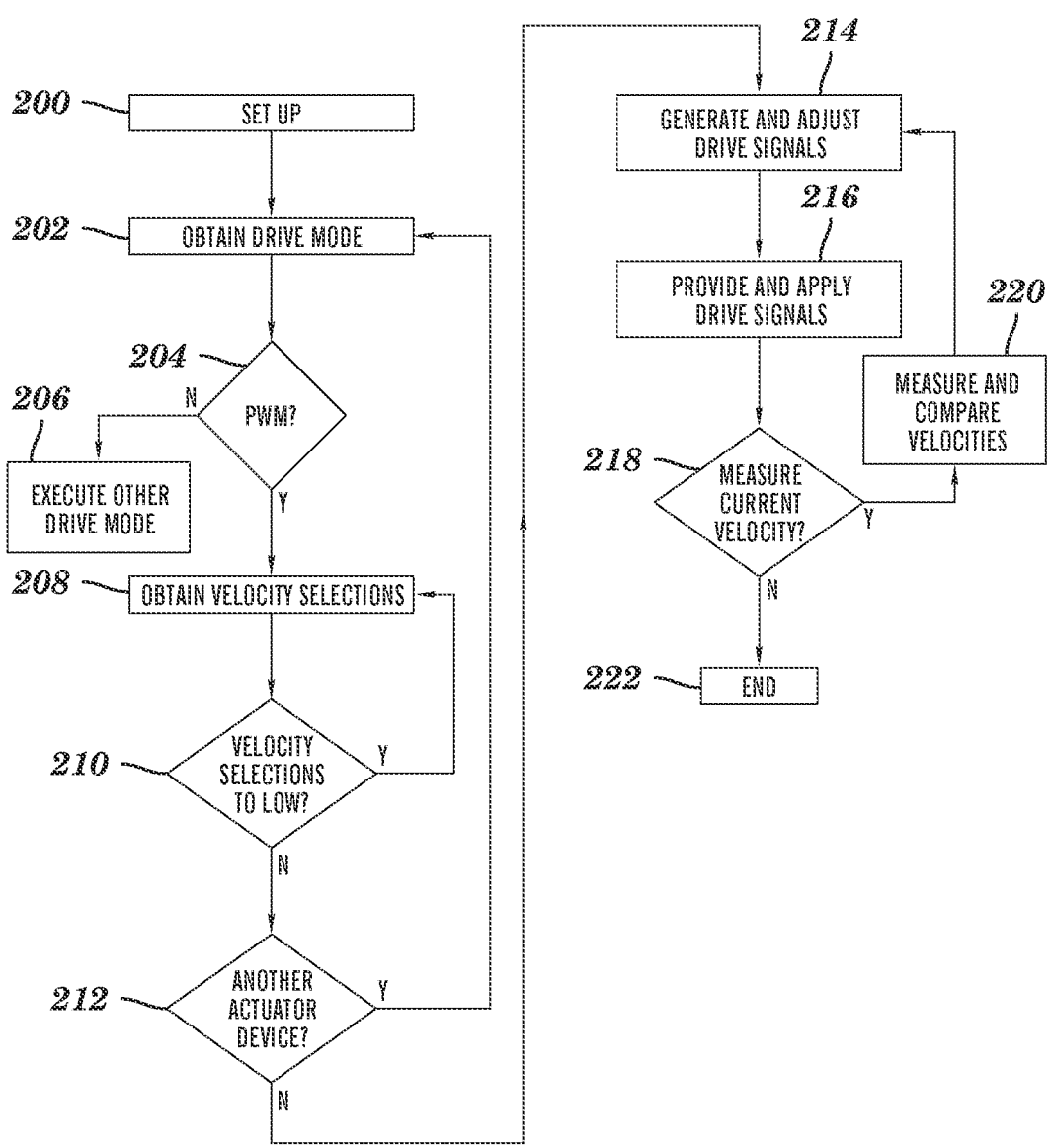
FIG. 4 is a flow chart of a method for controlling velocity of an at least partially resonant actuator system in accordance with embodiments of the present invention.

Referring to FIG. 3, an at least partially resonant drive actuator system 100(3) in accordance with other embodiments of the present invention is illustrated. The actuator system 100(3) is the same as the actuator system 100(1) in structure and operation, except as illustrated and described herein. Elements in actuator system 100(3) which are like those in actuator system 100(1) have like reference numerals. The actuator system 100(3) includes an actuator device 102 (3) and a driving system 104(3) comprising an actuator controller system 106(3) and a driver assembly 108(3), although the system can comprise other numbers and types of systems, devices, and components which are connected in other manners.

The actuator device 102(3) generates a two-dimensional trajectory to frictionally couple to and drive a moveable load, such as an optical lens by way of example only, in either of at least two opposing directions, although the actuator device 102(3) can generate other types of trajectories, be coupled in other manners and at other locations, and move other types of loads in other directions. The semi-resonant or partially resonant actuator device 102(3) that generates the two-dimensional trajectory to frictionally couple to and drive a moveable load in this embodiment is the same in structure and operation as semi-resonant or partially resonant actuator device illustrated and disclosed in U.S. patent application Ser. No. 12/466,929, filed May 15, 2009 for, "Automated Drive Frequency Control For Resonant Actuator Systems And Methods Thereof" which is herein incorporated by reference, although other types of actuator devices can be used.

The actuator device 102(3) includes an asymmetrical, elongated structure 134, although the actuator device 102(3) can comprise other types of structures with other shapes and symmetries. The elongated structure 134 has a depth D with a bending mode having a first nominal mechanical resonant frequency "fres1" and a height H with a bending mode having a second nominal mechanical resonant frequency "fres2." The height H is generally greater than the depth D so the second nominal mechanical resonant frequency "fres2" is higher than first nominal mechanical resonant frequency "fres1", although the structure can have other dimensions. By way of example only, other factors that affect nominal mechanical resonance frequency include manufacturing tolerances, material stiffness, mass, and location and orientation of internal electrodes. As described above, factors that affect an operational mechanical frequency of the structure 134 include, by way of example only, actuator temperature and ambient temperature.

The elongated structure 134 includes four piezoelectric regions 136, 138, 140, and 142, and electrodes 144(1) and 144(2), electrodes 146(1) and 146(2), electrodes 148(1) and 148(2), and electrodes 150(1) and 150(2), although the structure 102(3) can comprise other numbers, types and shapes of structures with other numbers and types of regions and connectors. By way of example only, in alternative embodiments one of the two piezoelectric regions 136 and 142 and one of the piezoelectric regions 138 and 140, could be inactive which would reduce the drive amplitude, but otherwise would not alter the operation of the actuator system, although other combinations of active and inactive regions could be used.

Each piezoelectric region 136, 138, 140, and 142 has a polarity that is established by poling during manufacturing, creating a positive electrode and a negative electrode. The piezoelectric regions 136, 138, 140, and 142 are poled during manufacturing so that "L" shaped electrode 144(1) is negative (A−) and "L" shaped electrode 144(2) is positive (A+) for region 136, "L" shaped electrode 146(2) is negative (B−) and "L" shaped electrode 146(1) is positive (B+) for region 142, "L" shaped electrode 148(1) is negative (C−) and "L" shaped electrode 148(2) is positive (C+) for region 138, "L" shaped electrode 150(2) is negative (D−) and "L" shaped electrode 150(1) is positive (D+) for region 140, although the piezoelectric regions can be formed in other manners. In the elongated structure 134, the piezoelectric regions 138 and 140 are located adjacent each other and between outer piezoelectric regions 136 and 142 as illustrated, although the structure could have other numbers of piezoelectric regions in other configurations.

The driving system 104(3) is the same as the driving system 104(1) in structure and operation, except as illustrated and described herein. The driving system 104(3) includes an actuator controller system 106(3) and a driver assembly 108(3), although the driving system 104(3) can include other types and numbers of systems, devices, and components in other configurations.

The actuator controller 106(3) is the same as actuator controller 106(1) in structure and operation, except as illustrated and described herein. The actuator controller system 106(3) includes an actuator processing device 124(3) with a PWM generator system 126(3) and the voltage source 128, although the actuator controller 106(3) can include other types and numbers of systems, devices, and components in other configurations.

The actuator processing device 124(3) is the same as the actuator processing device 124(1) in structure and operation, except as described and illustrated herein. The actuator processing device 124(3) includes the processor, the memory, the communication interface system, and the PWM generator system 126(3) which are coupled together by a bus or other link, although other numbers and types of systems, devices, and components in other configurations can be used and the PWM generator 126(3) can be separate from the actuator processing device 124(3). The processor in the actuator processing device 124(3) executes a program of stored instructions for one or more aspects of the present invention as described herein, including for controlling velocity of the at least partially resonant actuator device 102(3). The memory in the actuator processing device 124(3) stores these programmed instructions for one or more aspects of the present invention as described herein, although some or all of the programmed instructions could be stored and/or executed elsewhere. The communication interface system in actuator processing device 124(3) is used to operatively couple and communicate between the actuator processing device 124(3) and the driver assembly 108(3) along with the actuator device 102(3) via one or more communications networks, although other types and numbers of connections, configurations, and communication manners can be used.

The PWM signal generator 126(3) is the same as the PWM generator 126(1) and generates at least two low-voltage driving signals 154(1) and 154(3) which are provided to full bridge drive circuits 156(1) and 156(2) in driver assembly 108(2) in response to instructions from the actuator processing device 124(2), although the PWM signal generator 126(3) could generate other numbers and types of signals which are provided to other types and numbers of systems or devices. Inverters 158(1) and 158(2) are coupled between the pulse width modulated signal generator 126(3) and the driver assembly 108(3) and each receive the low-voltage driving signals 154(1) and 154(3), respectively, which are inverted to generate additional low-voltage driving signals 154(2) and 154(4), respectively. The low voltage and inverted driving signals 154(1), 154(2), 154(3), and 154(4) are coupled through the driver assembly 108(3) to drive the four piezoelectric regions 136, 138, 140, and 142, although other numbers and types of signals could be generated and used.

The driving signals 154(1), 154(2), 154(3), and 154(4) are used to drive and control the velocity of the operation of actuator device 102(3). The driving signals 154(1), 154(2), 154(3), and 154(4) are phase shifted by the driving system 108(3) for moving the elongated structure 134 in two directions, although other manners for driving the actuator device 102(3) can be used. The elongated structure 134 has two bending modes, mode1 and mode2, which each having different nominal and operational mechanical resonant frequencies. The vibration amplitude in either of these bending modes is dependent on the driving frequency of the applied driving signals. When the driving system 108(3) applies driving signals at the nominal and/or operational mechanical resonant frequency for one of the bending modes, such as the frequency "fres1" of mode1 to both bending modes of the structure 134, the vibration amplitude is fully amplified for the bending mode operating at its operational mechanical resonant frequency and is only partially amplified for the other bending mode which is operating at partial resonance. When the driving system 108(3) applies driving signals at the operational mechanical resonant frequency "fres2" for the other one of the bending modes, such as the frequency of mode1, to both bending modes of the structure 134, the vibration amplitude is fully amplified for the bending mode operating at its operational mechanical resonant frequency and is only partially amplified for the other bending mode which is operating at partial resonance.

Partial resonance can also be referred to as semi-resonance, which is now described in greater detail. In a typical mechanical system under forced excitation at frequency f, the normalized amplitude A is:

$$A = \frac{Q_M}{\sqrt{z^2 + (z^2 - 1)^2 Q_M^2}}$$

where A is the amplitude (relative to DC level $A_o$).

$$z = \frac{f}{f_o}$$

where $f_o$ is the nominal mechanical resonant frequency of this system and f is the driving frequency. $Q_M$ is the mechanical quality factor, ($Q_M$ can be as high as 100 or more). For a typical amplitude resonance curve for frequency from 0 (DC) to well past nominal mechanical resonant frequency ($f_o$), amplitude A at DC is normalized to 1; amplitude A at resonance ($f = f_o$) is amplified by $Q_M$; amplitude at $f \gg f_o$ drops to close to 0. Amplitude A can range from 1 (at DC) to $Q_M$ at resonant frequency. In these embodiments, partial resonance or semi-resonance occurs when A ranges between about 2 to $$\frac{Q_M}{2},$$

although other ranges outside of this range could be used, such as when A is between 1 and $Q_M$ could be used.

Referring back to the actuator controller 106(3), the voltage source 128 is a battery supply system that is coupled to and supplies power to run the actuator processing device 124(3) and to each $V_{dd}$ of the driver assembly 108(3) (for ease of illustration the coupling to each $V_{dd}$ of the driver assembly 108(3) is not shown), although other types and numbers of power supplies which supply power to types and numbers of system, devices, and components can be used.

The driver assembly 108(3) is the same in structure and operation as the driver assembly 108(1) described earlier with reference to FIG. 1 except as illustrated and described herein, although other types of driver assemblies can be used, such as one with half bridge circuits. The driver assembly 108(3) includes the pair of full bridge drive circuits 156(1) and 156(2) each of which are coupled to the voltage source 128 and have four outputs to provide the square wave drive signals 152(1)-152(4) to actuator device 102(3), although other types and numbers of driving circuits and systems, such as a half bridge circuit by way of example only, with other number of outputs which provide other types of signals, such as sinusoidal shaped-signals by way of example only, can be used. The output from full bridge drive circuit 156(1) with drive signal 152(1) is coupled to electrodes 144(1) and 148(1), the output from full bridge drive circuit 156(1) with drive signal 152(2) is coupled to electrodes 144(2) and 146(2), the output from full bridge drive circuit 156(1) with drive signal 152(3) is coupled to electrodes 148(1) and 150(1), and the output from full bridge drive circuit 156(1) with drive signal 152(4) is coupled to electrodes 148(2) and 150(2), although other types and numbers of connections could be used. One of the advantages of using a full bridge drive circuit is that the effective voltage differential across the positive electrode and negative electrode of each of the piezoelectric regions 136, 138, 140, and 142 is twice the supply voltage, which effectively doubles the mechanical output as compared with a half bridge circuit with the same supply voltage, which saves space. Since the components and operation of full bridge drive circuits are well known to those of ordinary skill in the art, they will not be described in greater detail herein. Additionally, although not shown the actuator devices 102(3) may have the position sensor 133 or other type of sensor which provides feedback on the measured velocity of the actuator device 102(3) to be used in a closed feedback loop adjust the velocity of the actuator device 102(3).

Figure 5:
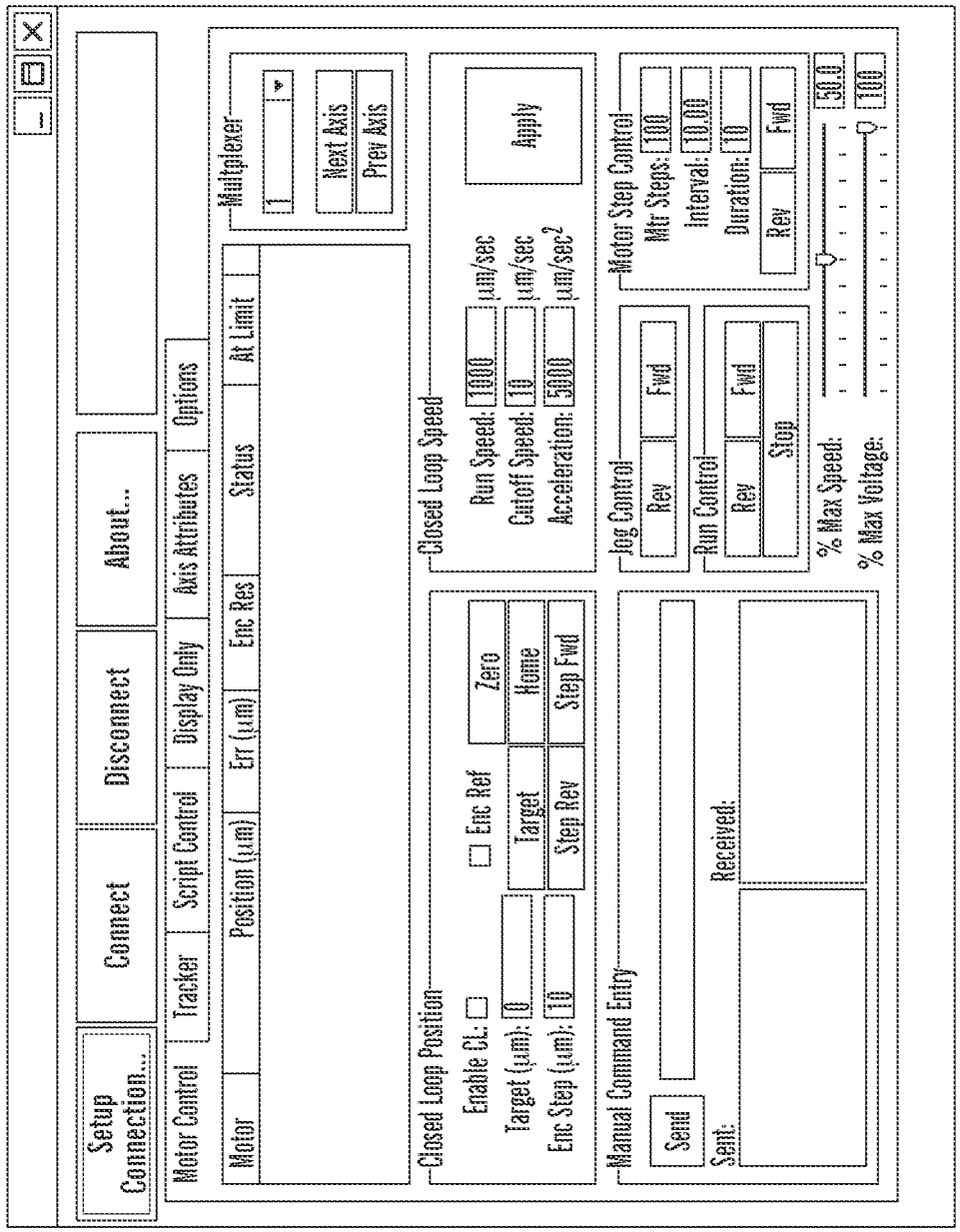
FIG. 5 is a screen shot of a user interface for an initial connection and setup.

Referring to FIGS. 1 and 4-9, a method for controlling velocity of a resonant actuator system 100(1) will now be described. In step 200, the display in the actuator processing device 124(1) provides a graphical user interface for an initial connection to and setup of the actuator system 100(1), although other types and manners for initiating the actuator system 100(1) can be used. By way of example only, a screen shot of a graphical user interface for an initial connection and setup of the actuator system 100(1) is illustrated in FIG. 5. Initiation and set up information is entered with the user input device for the actuator processing device 124(1), such as the number and type of actuator devices by way of example only, although the information can be obtain in other manners, such as from memory in the actuator processing device 124(1).

Figure 6:
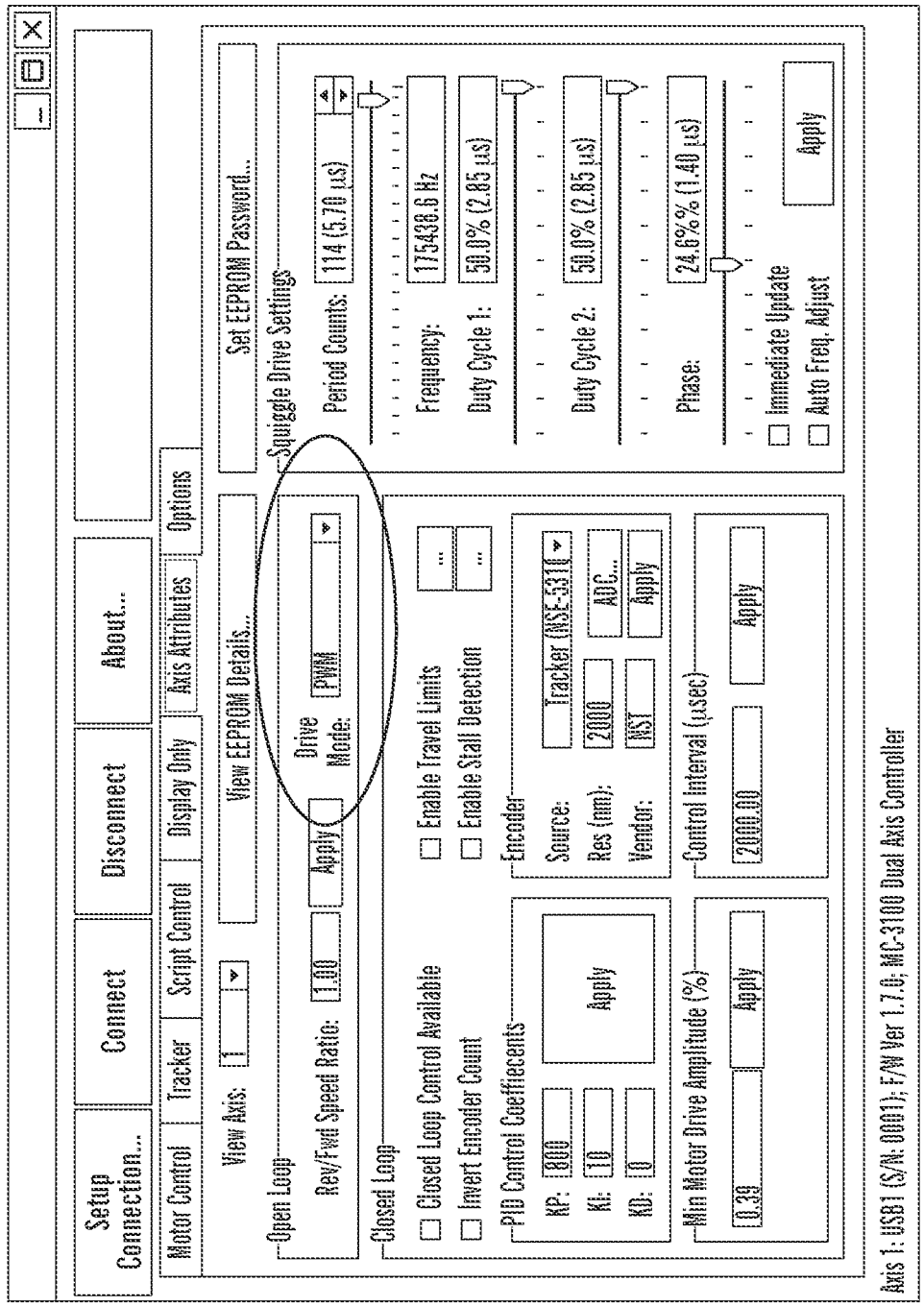
FIG. 6 is a screen shot of a user interface for a drive mode selection.

Once the necessary initiation and set up information has been entered or otherwise obtained, in step 202 the display in the actuator processing device 124(1) provides a graphical user interface for selecting a drive mode for the actuator device 102(1), although other types and manners for obtaining a selection of the drive mode for the actuator device 102(1) can be used, such as retrieving the selected drive mode from memory by actuator processing device 124(1). By way of example only, a screen shot of a graphical user interface for selecting a drive mode for the actuator device 102(1) with the drive mode selection input circled is illustrated in FIG. 6. The selected drive mode for the actuator device 102(1) is entered with the user input device for the actuator processing device 124(1), such as pulse width modulation drive mode or burst mode.

In step 204, the actuator processing device 124(1) determines whether a pulse width modulation drive mode has been selected. If in step 204 the actuator processing device 124(1) determines a pulse width modulation drive mode has not been selected, then the No branch is taken to step 206. In step 206, the actuator processing device 124(1) executes the other selected drive mode, such as a burst mode which is well known to those of ordinary skill in the art. If in step 204 the actuator processing device 124(1) determines a pulse width modulation drive mode has been selected, then the Yes branch is taken to step 208.

Figure 7:
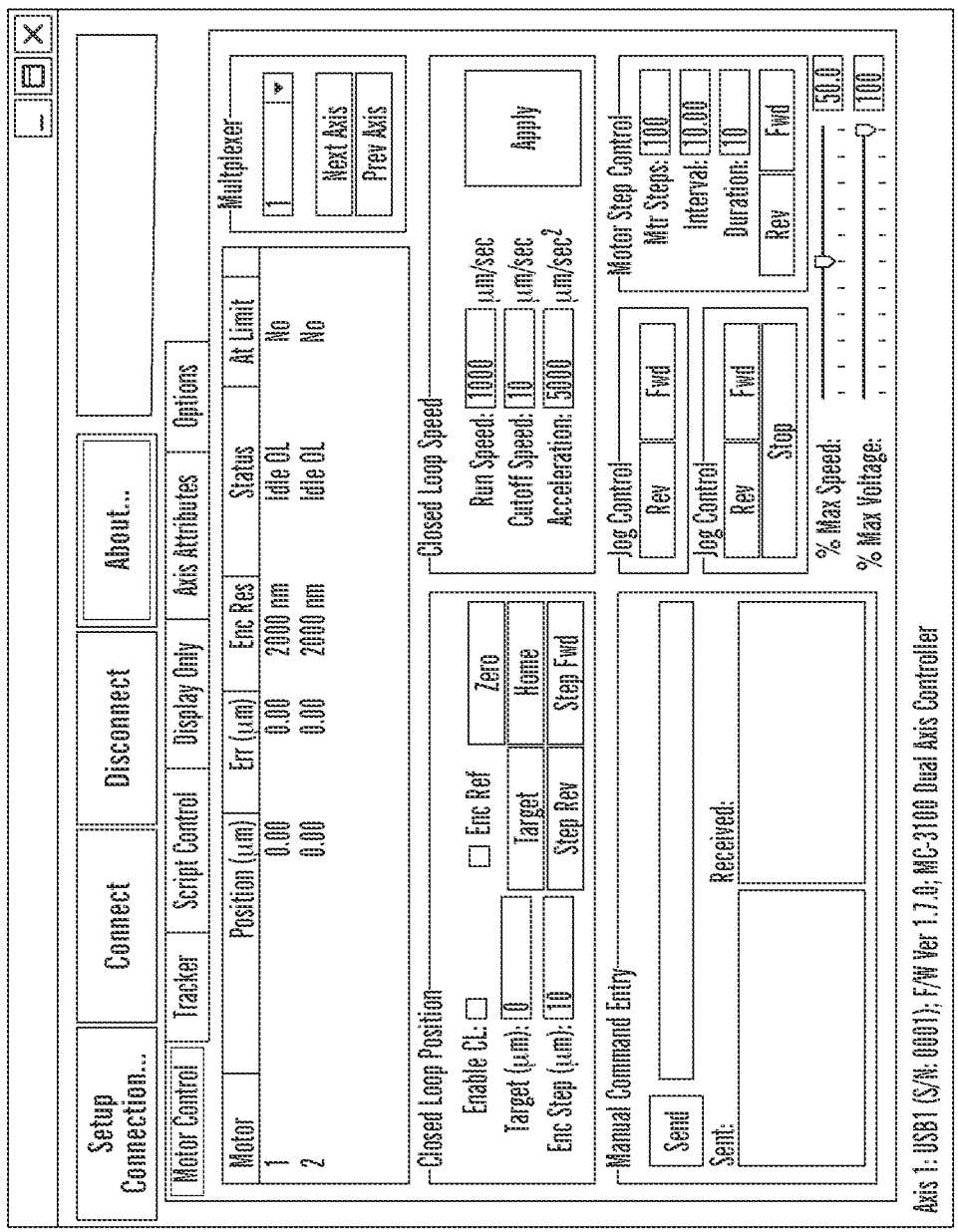
FIG. 7 is a screen shot of a user interface for percentage of maximum speed and maximum voltage selections.

In step 208, the actuator processing device 124(1) provides a graphical user interface for selecting a percentage of maximum speed to adjust a width of the pulse 141 of the drive signals 120(1) and 122(1) and a percentage of maximum voltage to adjust a drive voltage of the drive signals 120(1) and 122(1) and an operational velocity range for the actuator device 102(1), although other manners for obtaining a selection of either the percentage of maximum speed or the percentage of maximum voltage for the actuator device 102(1) can be used, such as retrieving the selected percentages from memory. By way of example only, a screen shot of a graphical user interface which provides for the selection of a percentage of maximum speed and maximum voltage for the actuator device 102(1) in the lower right hand corner is illustrated in FIG. 7. The selected percentage of maximum speed and the selected percentage of maximum voltage for the actuator device 102(1) is entered with the user input device for the actuator processing device 124(1), although the selections may be obtained in other manners, such as from a default setting of from memory in the actuator processing device 124(1).

In step 210, the actuator processing device 124(1) determines whether the selected percentage of maximum speed to adjust the width of the pulse 141 of the drive signals 120(1) and 122(1) is to low for the actuator device 102(1) to be operational. In these embodiments, the width of the one or more pulses 141 of the driving signals 120(1) and 122(1) can be adjusted between about fifteen percent to about fifty percent of a period of the drive frequency of the driving signal 120(1) and 122(1) to stay within the operational velocity range for the resonant actuator device 102(1), although other ranges can be used. Accordingly, the operational velocity range for the actuator device 102(1) ranges between a minimum velocity when the width of the pulses 141 are each about fifteen percent of the period of the drive frequency of the driving signal 120(1) and 122(1) and a maximum velocity when the width of the pulses 141 are each about fifty percent of the period of the drive frequency of the driving signal 120(1) and 122(1). In these embodiments, when the width of the pulses 141 are below about fifteen percent of a period of the drive frequency of the driving signal, the actuator device 102(1) will no longer work. The drive voltage for the drive signals 120(1) and 122(1) can be set so the maximum velocity for the actuator device 102(1) is reached when the width of the one or more pulses 141 of the driving signals 120(1) and 122(1) is about fifty percent of the period of the drive frequency of the driving signals 120(1) and 122(1), although other drive voltages can be selected.

If in step 210 the actuator processing device 124(1) determines the selected percentage of maximum speed is to low, then the Yes branch to step 208 where the another selection of a percentage of maximum speed and a percentage of maximum voltage for the actuator device 102(1) cab be obtained. If in step 210 the actuator processing device 124(1) determines the selected percentage of maximum speed is to low, then the No branch to step 212.

In step 212, the actuator processing device 124(1) determines whether there is another actuator device which requires selections of drive mode, percentage of maximum speed, and a percentage of maximum voltage, although other types and numbers of other selections may be required. If in step 212 the actuator processing device 124(1) determines there is another actuator device which requires selections, then the Yes branch is taken back to step 202 where the selections for the additional actuator device are determined in the same manner as described earlier. Each actuator device can have a different selection for the percentage of maximum speed which is obtained by adjusting the width of the pulses of the drive signals 120(1) and 122(1), however a selection of a percentage of maximum voltage will result in the same change in drive voltage for each actuator device 102(1) and 102(2). If in step 212 the actuator processing device 124(1) determines there is not another actuator device which requires selections, then the No branch is taken to step 214.

In step 214, the PWM generator system 126(1) generates and adjusts the drive signals 120(1) and 122(2) for the actuator device 102(1) in response to instructions received from the actuator processing device 124(1), such as the pulse width, drive voltage, shape and drive frequency of the drive signals. The instruction from the actuator processing device 124(1) for adjusting the width of the pulses of the drive signals 120(1) and 122(1) is based on the obtained percentage of maximum speed to adjust a width of the pulse of the drive signals 120(1) and 122(1) entered in step 208, although the adjustment can be made by the actuator processing device 124(1) based on other factors and in other manners. By way of example only, the adjustment could be made by the actuator processing device 124(1) based on stored programmed instructions or based on feedback from sensor 133 on the current measured velocity for the actuator device 102(1). With feedback on the current velocity from the sensor 133, the actuator processing device 124(1) can increase or decrease the width of the pulses of drive signals 120(1) and 122(1) until the selected operating velocity substantially matches the current measured velocity, although other manners for adjusting the velocity of the actuator device 102(1) to match the selected operating voltage can be used. For example the drive voltage of the drive signals 120(1) and 122(1) can be increased or decreased to adjust the current measured velocity until it substantially matches the selected operating velocity for the actuator device 102(1).

Figure 8A:
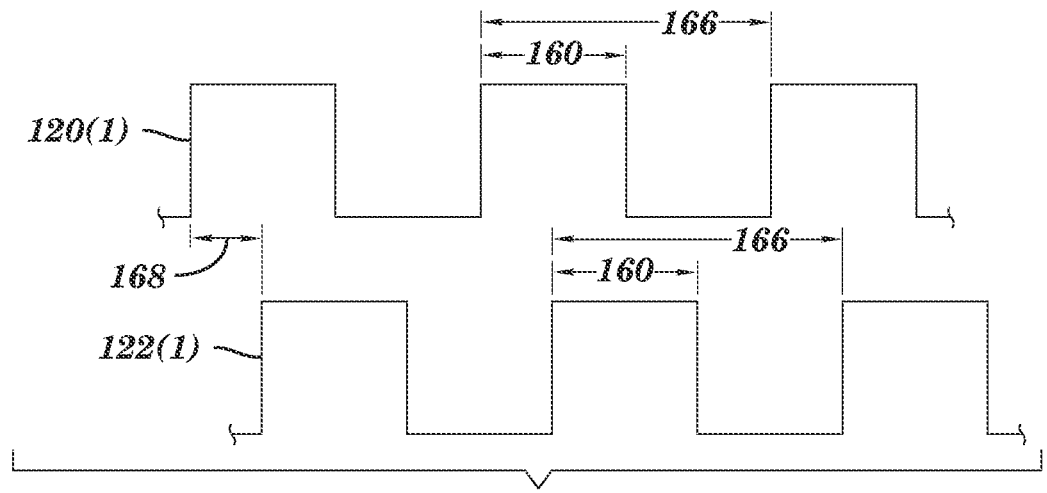
FIGS. 8A-8C are timing diagrams of three different exemplary drive signals provided by an actuator controller in the resonant actuator system shown in FIG. 1.
Figure 8B:
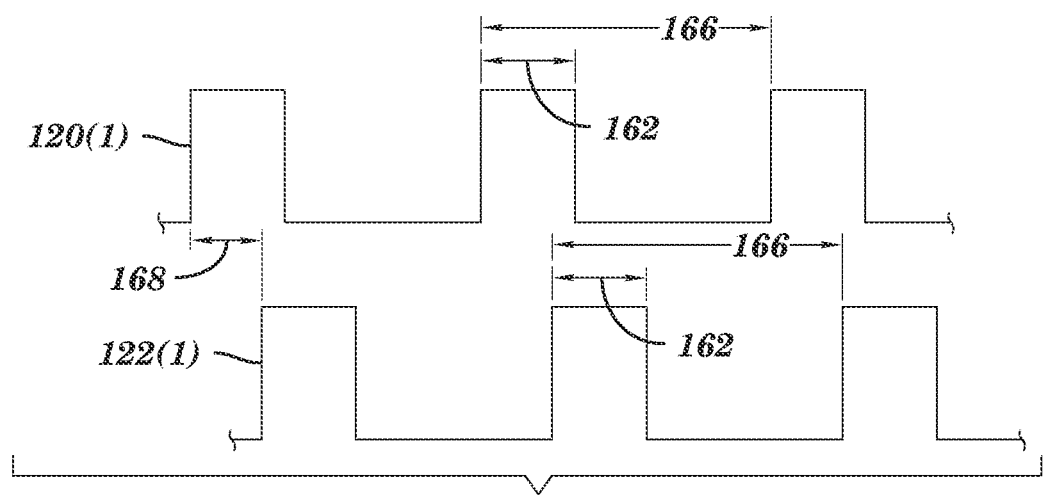
Figure 8C:
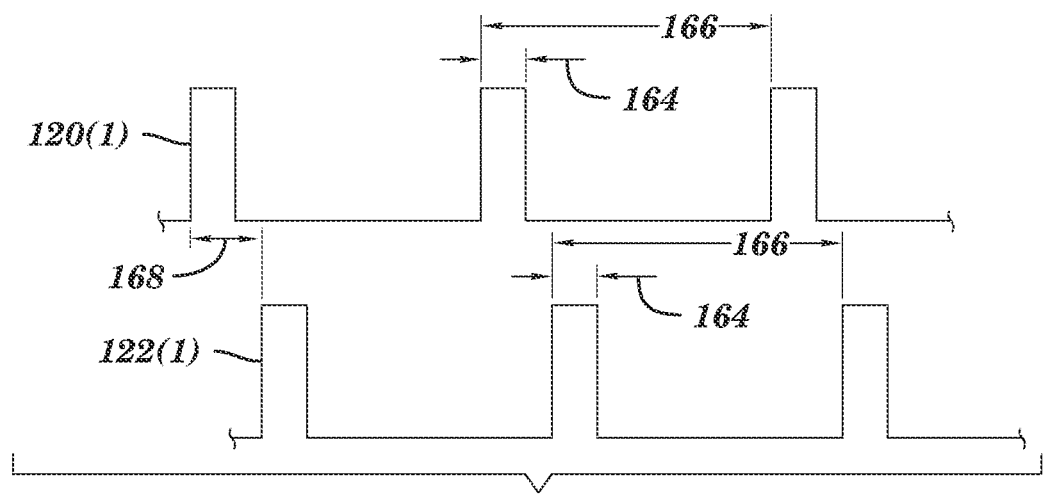

By way of example only, timing diagrams of three different examples of drive signals 120(1) and 122(1) adjusted at first, second, and third pulse widths 160, 162, and 164, respectively, by the PWM generator system 126(1) in response to instructions received from the actuator processing device 124(1) are illustrated in FIGS. 8A-8C. More specifically, the pulse width 160 of signals 120(1) and 122(1) in FIG. 8A is about fifty percent of the width 166 of a single period of a drive frequency for the driving signals 120(1) and 122(1) when the obtained percentage of maximum speed is at about 100 percent. The pulse width 162 of drive signals 120(1) and 122(1) in FIG. 8B is about thirty-three percent of the width 166 of the single period of the drive frequency for the driving signals 120(1) and 122(1). The pulse width 164 of signals 120(1) and 122(1) in FIG. 8C is about sixteen percent of the width 166 of the single period of the drive frequency for the driving signals 120(1) and 122(1). When the pulse width begins to go below about fifteen percent, the actuator devices are no longer operational, although this percentage can vary. Additionally, in these examples the drive signal 120(1) is about 90 degrees out of phase with the drive signal 122(1) as illustrated by reference numeral 168, although the drive signals 120(1) and 122(1) could have other phase shift differences.

Additionally, in step 214 the instructions from the actuator processing device 124(1) may also adjust the drive voltage of the drive signals 120(1) and 122(1) based on the obtained selection of the percentage of maximum voltage of the drive signals 120(1) and 122(1) entered in step 208, although the adjustment can be made by the actuator processing device 124(1) in other manners. By way of example only, the adjustment could be made by the actuator processing device 124(1) based on stored programmed instructions.

In step 216, the drive signals 120(1) and 122(1) are provided to and applied at the actuator device 102(1) to drive the rotation of the threaded shaft 114 in the passage 112 in element 110 in actuator device 102(1) at the selected operating velocity in the manner illustrated and described herein.

In step 218, the actuator processing device 124(1) determines whether the current velocity of the actuator device 102(1) is being monitored and measured. If in step 218 the actuator processing device 124(1) determines the current velocity of the actuator device 102(1) is being monitored and measured, then the Yes branch is taken to step 220. In step 220, the actuator processing device 124(1) compares the current measured velocity of the actuator device 102(1) against the selected operating velocity and obtains a difference. The actuator processing device 124(1) determines whether an adjustment to increase or decrease a width of the pulses of drive signals 120(1) and 122(1) with PWM generator system 126(1) to adjust the current measured velocity is needed based on the obtained difference, although other types of feedback and manners for adjusting the velocity can be used. By way of example, the actuator processing device 124(1) may adjust the drive voltage of the drive signals 120(1) and 122(1) up or down to increase or decrease the current measured velocity to substantially match the selected operating velocity. Once the actuator processing device 124(1) has determined any necessary adjustment as the result of the feedback, the method proceeds to step 214 to implement the adjustment as described earlier. If in step 218 the actuator processing device 124(1) determines the current velocity of the actuator device 102(1) is not being monitored and measured, then the No branch is taken to step 222 where this method ends.

The operation of the actuator systems 100(2) and 100(3) is the same as illustrated and described herein for actuator system 100(1), except as illustrated and described herein. With the operation of the actuator system 100(2), in step 212 the actuator processing device 124(1) will recognize there is another actuator device 102(2) and return to step 202 for a selection of drive mode, a selection of percentage of maximum speed and for a selection of a percentage of maximum drive voltage, although other types and numbers of parameters could be requested and obtained. As discussed earlier, actuator processing device 124(1) can independently control the velocity of actuator devices 102(1) and 102(2) with separate pulse width modulation, however any adjustment to drive voltage will be applicable to both actuator devices 102(1) and 102(2). Additionally, in step 216 the drive signals 120(1) and 122(1) are applied to drive the rotation of the threaded shaft 114 in the passage 112 in element 110 in actuator device 102(1) at the selected operating velocity and drive signals 120(2) and 122(2) are applied to drive the rotation of the threaded shaft 114 in the passage 112 in element 110 in actuator device 102(2) at the selected operating velocity in the manner illustrated and described herein. Further, in steps 218 and 220, one or both of the actuator devices 102(1) and 102(2) could have a sensor 133 to provide feedback for comparing and adjusting the current measured velocity to substantially match the selected operating velocity by further adjustments, such as to the width of pulses or the drive voltage of drive signals 120(1) and 122(1) and the drive signals 120(2) and 122(2).

With the operation of the actuator system 100(3), in step 216 the drive signals 152(1)-152(4) are applied in actuator device 102(3) to generate a two-dimensional trajectory to frictionally couple to and drive a moveable load at the selected operating velocity in the manner illustrated and described herein. Additionally, in steps 218 and 220 the actuator devices 102(3) could have a sensor 133 to provide feedback for comparing and adjusting the current measured velocity to substantially match the selected operating velocity by further adjustments, such as to the width of pulses or the drive voltage of drive signals 152(1)-152(4).

Example

Figure 9:
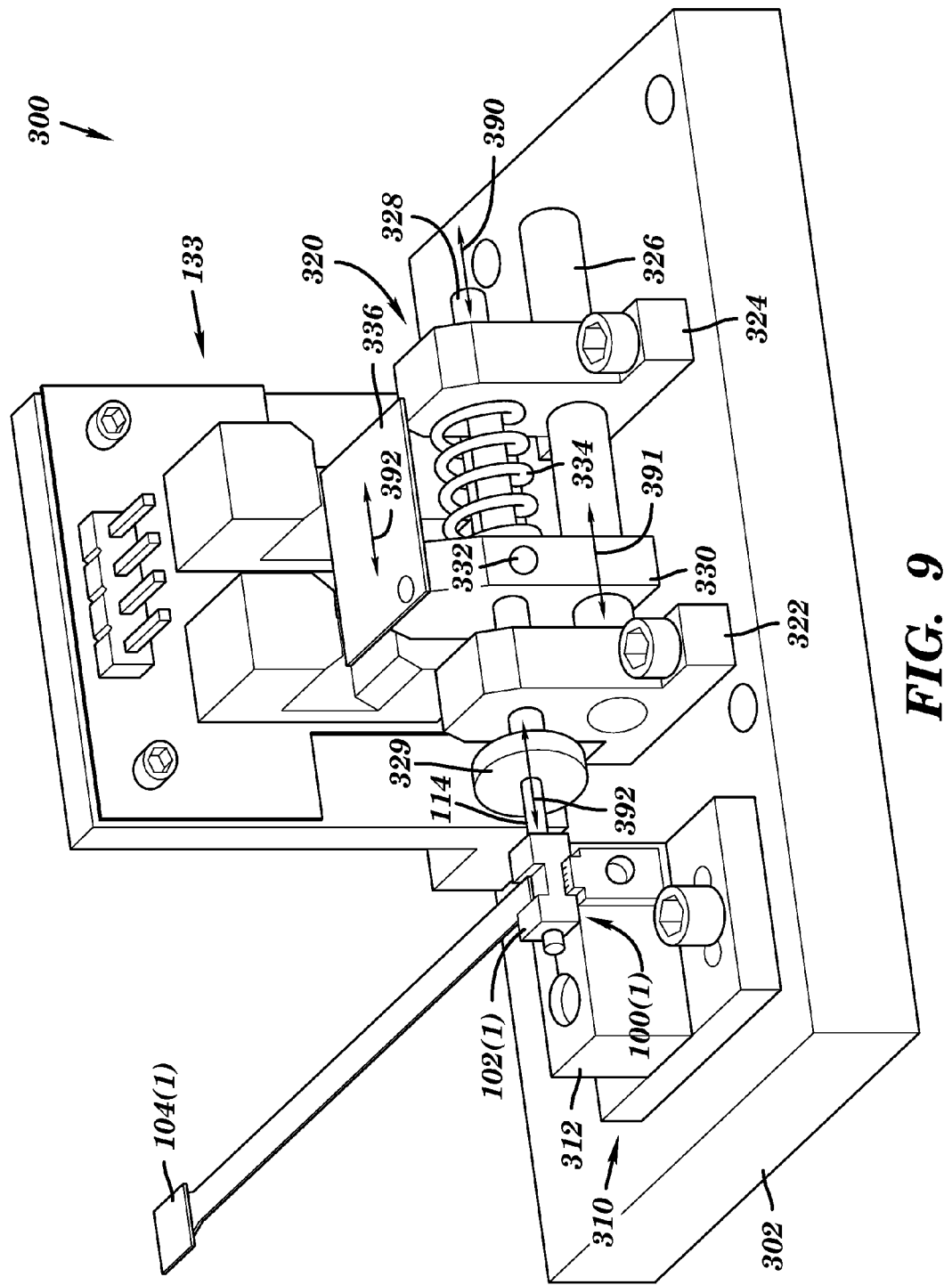
FIG. 9 is a partial block diagram and partial perspective view of a load testing apparatus placing the resonant actuator system shown in FIG. 1 under an exemplary test load.

Referring to FIG. 9, a load testing apparatus 300 for placing the resonant actuator system 100(1) under an exemplary test load is illustrated. The exemplary test load provided by the load testing apparatus 300 simulates an actual load, such as a lens, applied to the actuator system 100(1). This load testing apparatus 300 includes a base 302, an actuator device mount 310, a load 320, and a load sensor 340, although the load testing apparatus could have other numbers and types of systems, devices, and elements in other configurations. The actuator device 102(1) is secured to a mounting block 312 of actuator device mount 310. The actuator device 102(1) is coupled to and in communication with the driving system 104(1) comprising the actuator controller system 106(1) and the driver assembly 108(1) which was illustrated and described in greater detail herein and therefore will not be repeated here again.

The test load 320 includes a pair of support blocks 322 and 324 that are joined to base 302 and that support a lower slide bar 326 and an upper slide bar 328. The lower slide bar 326 is immobilized in blocks 322 and 324 by an interference fit therewith, although other manners for securing, such as with fasteners could be used. The upper slide bar 328 is slideable within blocks 322 and 324 in the directions indicated by bidirectional arrow 390. The upper slide bar 328 may be made of a bearing material, or may be provided with a lubricant to minimize friction with blocks 322 and 324. Slide bars 326 and 328 pass through holes in a push plate 330 which is slideable along the lower slide bar 326 as indicated by bidirectional arrow 391. The push plate 330 is also joined to upper slide bar 328 by a set screw 332, although other manners of fastening could be used. Accordingly, when the upper slide bar 326 is displaced laterally, the push plate 330 is likewise displaced laterally. A spring 334 is disposed around the upper slide bar 328 and is in contact with push plate 330 and block 324. The spring 334 provides a force that resists the displacement of push plate 330 toward block 324.

In performing a test, the actuator device 102(1) of the actuator system 100(1) is operated with the threaded shaft 114 in contact with the flange 329 of the upper slide bar 328. When the shaft 114 of the actuator device 102(1) is driven in forward and reverse directions as indicated by bidirectional arrow 392 at a selected velocity, the upper slide bar 326 and push plate 330 are displaced accordingly, thereby compressing and decompressing the spring 334. A detection plate 336, which is joined to push plate 330, moves bi-directionally with respect to sensor 133 as indicated by arrow 392, and is detected by sensor system 133. As illustrated and described in greater detail earlier, the sensor system 133 is coupled to the actuator processing device 124(1) to provide feedback on the current velocity of the threaded shaft 114. Again, a variety of different types and numbers of sensor systems can be used, such as an optical sensor, a magnetic sensor, or any other sensor used to measure position and velocity well known to those of ordinary skill in the art.

Figure 10:
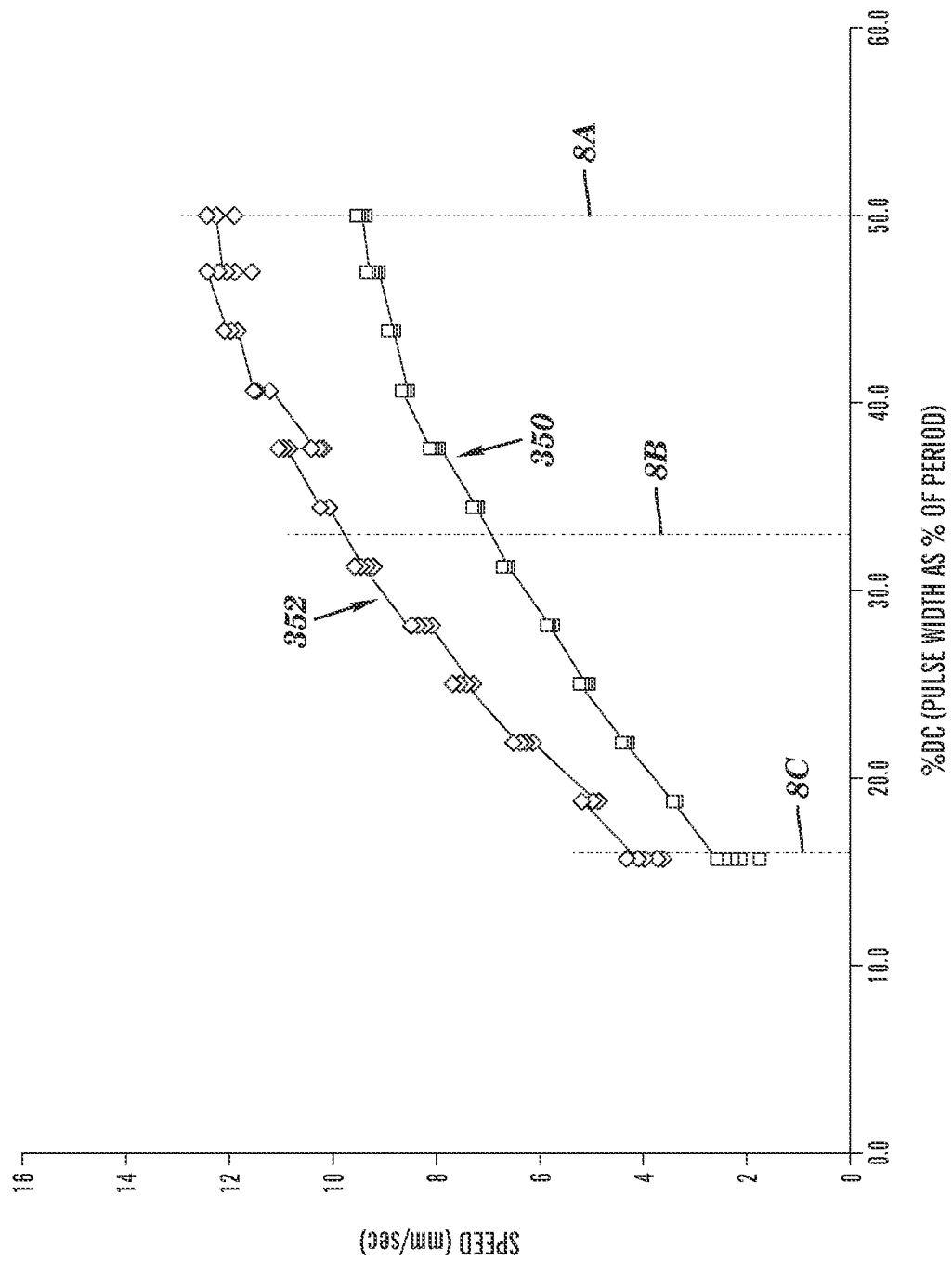
FIG. 10 is an exemplary graph of velocity versus percentage of pulse width of the driving signal for the resonant actuator system placed under the exemplary test load by the load testing apparatus shown in FIG. 9.

With the load testing apparatus 300, the actuator device 102(1) can be tested to operate under load with varying pulse widths of the driving signals 120(1) and 122(1). By way of example only, FIG. 10 illustrates the velocity of the shaft 114 moving along the passage 112 in the actuator device 102(1) while in the load testing apparatus 300 and under the varying pulse widths for the driving signals 120(1) and 122(1) illustrated in FIGS. 8A-8C. Referring more specifically to FIG. 10, the lower data set 350 is the velocity or speed of shaft 114 on the forward stroke, i.e. the threaded shaft 114 is moving against the resistance of the spring 334 of the load 320. The upper data set 352 is the velocity or speed of the shaft 114 on the rearward stroke, i.e. the threaded shaft 114 is moving with assistance of the spring 334. As would be expected, for any given pulse width, the speed of shaft 114 is greater for the spring assisted rearward stroke than for the spring-resisted forward stroke. The X-axis of the plot is in units of pulse width as a percent of the period of one cycle. For example, the data indicated by the dotted line 8A is for the pulse width shown in FIG. 8A, the data indicated by the dotted line 8B is for the pulse width shown in FIG. 8B, and the data indicated by the dotted line 8C is for the pulse width shown in FIG. 8C. Additionally, as noted earlier, the ratio of pulse width 160 to period 166 in FIG. 8A is about 50 percent, the ratio of pulse width 162 to period 166 in FIG. 8B is about 33 percent, and the ratio of pulse width 164 to period 166 in FIG. 8c is about 16 percent.

Several observations can be made from the data of FIG. 10. First, the velocity reached a maximum at about the fifty percent pulse width shown in FIG. 8A. Operating at a pulse width of greater than fifty percent was counterproductive. Although not shown in the data of FIG. 10, at pulse widths greater than fifty percent, the speed of shaft 114 decreased. Additionally, attempting to operate at a pulse width of less than about fifteen percent was unsuccessful and thus, no data was obtained for pulse widths less than about fifteen percent. At lesser pulse widths, there is not enough energy supplied to cause the threaded shaft 114 to rotate and translate within the threaded passage 112. Further, it can be seen that good velocity control of the actuator device 102(1) can be attained through pulse width modulation of the driving signals 120(1) and 122(1), as the variation in speed as a percentage of pulse width is quite steady and predictable.

Accordingly, as described herein the present invention provides a number of advantages including providing more effective and efficient velocity control of resonant actuator systems and partially resonant actuator systems. With the present invention, the velocities of multiple at resonant actuator devices and a partially resonant actuator devices can be independently controlled using a single actuator controller. Additionally, the present invention is able to provide improved velocity control with lower power consumption and quieter operation than prior systems.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for controlling velocity of an at least partially resonant actuator system, the method comprising:
   obtaining at an actuator controller computing system a selected operating velocity within an operational velocity range for at least one of one or more at least partially resonant actuator devices;
   generating with the actuator controller computing system at least two driving signals with one or more pulses;
   adjusting with the actuator controller computing system a width of the one or more pulses within at least one cycle of the at least two driving signals for the at least one of one or more at least partially resonant actuator devices based on the selected operating velocity without detecting a phase difference between the at least two driving signals; and
   providing with the actuator controller computing system the at least two driving signals with the adjusted width of the one or more pulses to obtain the selected operating velocity at the at least one of one or more at least partially resonant actuator devices.

2. The method as set forth in claim 1 wherein the adjusting further comprises adjusting the width of the one or more pulses of the at least two driving signals between about fifteen percent to about fifty percent of a period of the fixed drive frequency of the at least two driving signals to stay within the operational velocity range for the at least one of one or more at least partially resonant actuator devices.

3. The method as set forth in claim 2 wherein the adjusting further comprises adjusting the width of the one or more pulses of the at least two driving signals to about fifty percent of the period of the drive frequency of the at least two driving signals to substantially obtain a maximum velocity within the operational velocity range for the at least one of one or more at least partially resonant actuator devices.

4. The method as set forth in claim 1 further comprising:
   obtaining at an actuator controller computing system a selected maximum velocity for the operational velocity range for the one or more at least partially resonant actuator devices;
   adjusting with the actuator controller computing system a peak drive voltage of the at least two driving signals for the one or more at least partially resonant actuator devices based on the selected maximum velocity; and
   providing with the actuator controller computing system the at least two driving signals with the adjusted drive voltage to obtain the selected maximum velocity for the operational velocity range.

5. The method as set forth in claim 4 wherein the adjusting with the actuator controller computing system the peak drive voltage of the at least two driving signals further comprises adjusting the peak drive voltage of the at least two driving signals to provide the selected maximum velocity for the one of the one or more at least partially resonant actuator devices when the width of the one or more pulses of the at least two driving signals is about fifty percent of the period of the drive frequency of the at least two driving signals.

6. The method as set forth in claim 1 further comprising:
   obtaining at the actuator controller computing system another selected operating velocity within an operational velocity range for at least one other of the one or more at least partially resonant actuator devices;
   adjusting with the actuator controller computing system a width of one or more pulses of another at least two driving signals for the at least one other of the one or more at least partially resonant actuator devices based on the selected operating velocity; and
   providing with the actuator controller computing system the another at least two driving signals with the adjusted width of the one or more pulses to obtain the another selected operating velocity at the at least one other of the one or more at least partially resonant actuator devices, wherein the selected operating velocity for the at least one of the one or more at least partially resonant actuator devices is different from the another selected operating velocity at the at least one other of the one or more at least partially resonant actuator devices.

7. The method as set forth in claim 6 further comprising:
   obtaining at an actuator controller computing system a selected maximum velocity for the operational velocity range for the at least one of the one or more at least partially resonant actuator devices and the at the at least one other of the one or more at least partially resonant actuator devices;
   adjusting with the actuator controller computing system a peak drive voltage of the another at least two driving signals for each of the at least one of the one or more at least partially resonant actuator devices and the at the at least one other of the one or more at least partially resonant actuator devices based on the selected maximum velocity; and
   providing with the actuator controller computing system the another at least two driving signals with the adjusted drive voltage for each of the at least one of the one or more at least partially resonant actuator devices and the at the at least one other of the one or more at least partially resonant actuator devices to obtain the selected maximum velocity for the operational velocity range.

8. The method as set forth in claim 1 further comprising:
   obtaining at the actuator control system a measurement of a current velocity of the at least one of one or more at least partially resonant actuator devices;
   comparing with the actuator controller computing system the measurement of the current velocity of the at least one of one or more at least partially resonant actuator devices against the selected operating velocity; and
   readjusting with the actuator controller computing system the width of the one or more pulses of the at least two driving signals at the at least one of the one or more at least partially resonant actuator devices based on the comparing.

9. The method as set forth in claim 1 wherein the one of the at least two driving signals is shifted 90 degrees out of phase with respect to a second of the at least two driving signals.

10. The method as set forth in claim 1 wherein a fixed driving frequency of the at least two driving signals is substantially equal to a mechanical resonant frequency of the at least one of one or more at least partially resonant actuator devices.

11. The method as set forth in claim 10 wherein the fixed driving frequency of the at least two driving signals is at a fixed offset from the mechanical resonant frequency of the at least one of one or more at least partially resonant actuator devices.

12. A non-transitory computer readable medium having stored thereon instructions for controlling velocity of an at least partially resonant actuator system comprising machine executable code which when executed by at least one processor, causes the processor to perform steps comprising:
   obtaining a selected operating velocity within an operational velocity range for at least one of one or more at least partially resonant actuator devices;
   generating at least two driving signals with one or more pulses;
   adjusting a width of the one or more pulses within at least one cycle of the at least two driving signals for the at least one of one or more at least partially resonant actuator devices based on the selected operating velocity without detecting a phase difference between the at least two driving signals; and
   providing the at least two driving signals with the adjusted width of the one or more pulses to obtain the selected operating velocity at the at least one of the one or more at least partially resonant actuator devices.

13. The medium as set forth in claim 12 wherein the adjusting further comprises adjusting the width of the one or more pulses of the at least two driving signals between about fifteen percent to about fifty percent of a period of the fixed drive frequency of the at least two driving signals to stay within the operational velocity range for the at least one of one or more at least partially resonant actuator devices.

14. The medium as set forth in claim 13 wherein the adjusting further comprises adjusting the width of the one or more pulses of the at least two driving signals to about fifty percent of the period of the drive frequency of the at least two driving signals to substantially obtain a maximum velocity within the operational velocity range for the at least one of one or more at least partially resonant actuator devices.

15. The medium as set forth in claim 12 further comprising:
   obtaining a selected maximum velocity for the operational velocity range for the one or more at least partially resonant actuator devices;
   adjusting a peak drive voltage of the at least two driving signals for the one or more at least partially resonant actuator devices based on the selected maximum velocity; and
   providing the at least two driving signals with the adjusted drive voltage to obtain the selected maximum velocity for the operational velocity range.

16. The medium as set forth in claim 15 wherein the adjusting the peak drive voltage of the at least two driving signals to provide the selected maximum velocity for the one of the one or more at least partially resonant actuator devices when the width of the one or more pulses of the at least two driving signals is about fifty percent of the period of the drive frequency of the at least two driving signals.

17. The medium as set forth in claim 12 further comprising:
   obtaining another selected operating velocity within an operational velocity range for at least one other of the one or more at least partially resonant actuator devices;
   adjusting a width of one or more pulses of another at least two driving signals for the at least one other of the one or more at least partially resonant actuator devices based on the selected operating velocity; and
   providing the another at least two driving signals with the adjusted width of the one or more pulses to obtain the another selected operating velocity at the at least one other of the one or more at least partially resonant actuator devices, wherein the selected operating velocity for the at least one of the one or more at least partially resonant actuator devices is different from the another selected operating velocity at the at least one other of the one or more at least partially resonant actuator devices.

18. The medium as set forth in claim 17 further comprising:
   obtaining a selected maximum velocity for the operational velocity range for the at least one of the one or more at least partially resonant actuator devices and the at the at least one other of the one or more at least partially resonant actuator devices;
   adjusting a peak drive voltage of the another at least two driving signals for each of the at least one of the one or more at least partially resonant actuator devices and the at the at least one other of the one or more at least partially resonant actuator devices based on the selected maximum velocity; and
   providing the another at least two driving signals with the adjusted drive voltage for each of the at least one of the one or more at least partially resonant actuator devices and the at the at least one other of the one or more at least partially resonant actuator devices to obtain the selected maximum velocity for the operational velocity range.

19. The medium as set forth in claim 12 further comprising:
   obtaining a measurement of a current velocity of the at least one of one or more at least partially resonant actuator devices;
   comparing the measurement of the current velocity of the at least one of one or more at least partially resonant actuator devices against the selected operating velocity; and
   readjusting the width of the one or more pulses of the at least two driving signals at the at least one of the one or more at least partially resonant actuator devices based on the comparing.

20. The medium as set forth in claim 12 wherein the one of the at least two driving signals is shifted 90 degrees out of phase with respect to a second of the at least two driving signals.

21. The medium as set forth in claim 12 wherein a fixed driving frequency of the at least two driving signals is substantially equal to a mechanical resonant frequency of the at least one of one or more at least partially resonant actuator devices.

22. The medium as set forth in claim 21 wherein the fixed driving frequency of the at least two driving signals is at a fixed offset from the mechanical resonant frequency of the at least one of one or more at least partially resonant actuator devices.

23. An actuator controller computing apparatus comprising:
   one or more processors;
   a memory coupled to the one or more processors which are configured to execute programmed instructions stored in the memory comprising obtaining a selected operating velocity within an operational velocity range for at least one of one or more at least partially resonant actuator devices;

generating at least two driving signals with one or more pulses;

adjusting a width of the one or more pulses within at least one cycle of the at least two driving signals for the at least one of one or more at least partially resonant actuator devices based on the selected operating velocity without detecting a phase difference between the at least two driving signals; and providing the at least two driving signals with the adjusted width of the one or more pulses to obtain the selected operating velocity at the at least one of the one or more at least partially resonant actuator devices.

24. The apparatus as set forth in claim 23 wherein the one or more processors is further configured to execute programmed instructions stored in the memory for the adjusting further comprises adjusting the width of the one or more pulses of the at least two driving signals between about fifteen percent to about fifty percent of a period of the fixed drive frequency of the at least two driving signals to stay within the operational velocity range for the at least one of one or more at least partially resonant actuator devices.

25. The apparatus as set forth in claim 24 wherein the one or more processors is further configured to execute programmed instructions stored in the memory for the adjusting further comprises adjusting the width of the one or more pulses of the at least two driving signals to about fifty percent of the period of the drive frequency of the at least two driving signals to substantially obtain a maximum velocity within the operational velocity range for the at least one of one or more at least partially resonant actuator devices.

26. The apparatus as set forth in claim 23 wherein the one or more processors is further configured to execute programmed instructions stored in the memory further comprising:

obtaining a selected maximum velocity for the operational velocity range for the one or more at least partially resonant actuator devices;

adjusting a peak drive voltage of the at least two driving signals for the one or more at least partially resonant actuator devices based on the selected maximum velocity; and providing the at least two driving signals with the adjusted drive voltage to obtain the selected maximum velocity for the operational velocity range.

27. The apparatus as set forth in claim 26 wherein the one or more processors is further configured to execute programmed instructions stored in the memory wherein the adjusting the peak drive voltage of the at least two driving signals to provide the selected maximum velocity for the one of the one or more at least partially resonant actuator devices when the width of the one or more pulses of the at least two driving signals is about fifty percent of the period of the drive frequency of the at least two driving signals.

28. The apparatus as set forth in claim 23 wherein the one or more processors is further configured to execute programmed instructions stored in the memory further comprising:

obtaining another selected operating velocity within an operational velocity range for at least one other of the one or more at least partially resonant actuator devices;

adjusting a width of one or more pulses of another at least two driving signals for the at least one other of the one or more at least partially resonant actuator devices based on the selected operating velocity; and providing the another at least two driving signals with the adjusted width of the one or more pulses to obtain the another selected operating velocity at the at least one other of the one or more at least partially resonant actuator devices, wherein the selected operating velocity for the at least one of the one or more at least partially resonant actuator devices is different from the another selected operating velocity at the at least one other of the one or more at least partially resonant actuator devices.

29. The apparatus as set forth in claim 28 wherein the one or more processors is further configured to execute programmed instructions stored in the memory further comprising:

obtaining a selected maximum velocity for the operational velocity range for the at least one of the one or more at least partially resonant actuator devices and the at the at least one other of the one or more at least partially resonant actuator devices;

adjusting a peak drive voltage of the another at least two driving signals for each of the at least one of the one or more at least partially resonant actuator devices and the at the at least one other of the one or more at least partially resonant actuator devices based on the selected maximum velocity; and providing the another at least two driving signals with the adjusted drive voltage for each of the at least one of the one or more at least partially resonant actuator devices and the at the at least one other of the one or more at least partially resonant actuator devices to obtain the selected maximum velocity for the operational velocity range.

30. The apparatus as set forth in claim 23 wherein the one or more processors is further configured to execute programmed instructions stored in the memory further comprising:

obtaining a measurement of a current velocity of the at least one of one or more at least partially resonant actuator devices;

comparing the measurement of the current velocity of the at least one of one or more at least partially resonant actuator devices against the selected operating velocity; and readjusting the width of the one or more pulses of the at least two driving signals at the at least one of the one or more at least partially resonant actuator devices based on the comparing.

31. The apparatus as set forth in claim 23 wherein the one of the at least two driving signals is shifted 90 degrees out of phase with respect to a second of the at least two driving signals.

32. The apparatus as set forth in claim 23 wherein fixed driving frequency of the at least two driving signals is substantially equal to a mechanical resonant frequency of the at least one of one or more at least partially resonant actuator devices.

33. The apparatus as set forth in claim 32 wherein the fixed driving frequency of the at least two driving signals is at a fixed offset from the mechanical resonant frequency of the at least one of one or more at least partially resonant actuator devices.

* * * * *